US009849920B2

(12) United States Patent
Kawata et al.

(10) Patent No.: US 9,849,920 B2
(45) Date of Patent: Dec. 26, 2017

(54) AUTOMOBILE BODY STRUCTURE

(71) Applicant: HONDA MOTOR CO., LTD., Minato-ku, Tokyo (JP)

(72) Inventors: Takahira Kawata, Wako (JP); Shotaro Ayuzawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/028,796

(22) PCT Filed: Oct. 14, 2014

(86) PCT No.: PCT/JP2014/077308
§ 371 (c)(1),
(2) Date: Apr. 12, 2016

(87) PCT Pub. No.: WO2015/056667
PCT Pub. Date: Apr. 23, 2015

(65) Prior Publication Data
US 2016/0251038 A1    Sep. 1, 2016

(30) Foreign Application Priority Data

Oct. 15, 2013   (JP) .................................. 2013-214773
Oct. 15, 2013   (JP) .................................. 2013-214774
(Continued)

(51) Int. Cl.
B62D 29/04     (2006.01)
B62D 25/02     (2006.01)
(Continued)

(52) U.S. Cl.
CPC ............ B62D 29/043 (2013.01); B60J 5/101 (2013.01); B62D 25/025 (2013.01); B62D 25/06 (2013.01);
(Continued)

(58) Field of Classification Search
CPC .... B62D 29/043; B62D 29/04; B62D 25/087; B62D 25/025; B62D 25/06; B62D 25/2036; B60J 5/101
See application file for complete search history.

(56) References Cited

U.S. PATENT DOCUMENTS

2012/0104793 A1*   5/2012   Danielson ............ B62D 29/046
296/181.1

FOREIGN PATENT DOCUMENTS

JP         H01-111575 A      4/1989
JP         H04-39054 Y2      9/1992
(Continued)

*Primary Examiner* — Glenn Dayoan
*Assistant Examiner* — Melissa A Black
(74) *Attorney, Agent, or Firm* — Carrier Blackman & Associates, P.C.; Joseph P. Carrier; Jingli Wang

(57)               ABSTRACT

An automobile body structure is provided in which a carbon fiber-reinforced plastic cabin formed of a bathtub shape includes an inverted U-shaped roll bar providing a connection between front parts of a pair of left and right side frames, and a pair of left and right roll bar-supporting bars connecting an upper portion of the roll bar to rear parts of the pair of left and right side frames. Since a rear part of a roof panel and a front part of a tailgate panel are supported on a mounting bracket provided on the roll bar-supporting bar, it is possible, by changing the fore-and-aft position of the mounting bracket, to freely set the rear end position of the roof panel and the front end position of the tailgate panel and, moreover, it is possible to strongly support the roof panel and the tailgate panel.

14 Claims, 21 Drawing Sheets

(30) Foreign Application Priority Data

Oct. 15, 2013 (JP) ................................ 2013-214775
Oct. 15, 2013 (JP) ................................ 2013-214826

(51) Int. Cl.
*B62D 25/20* (2006.01)
*B62D 25/06* (2006.01)
*B62D 25/08* (2006.01)
*B60J 5/10* (2006.01)

(52) U.S. Cl.
CPC ....... *B62D 25/087* (2013.01); *B62D 25/2036* (2013.01); *B62D 29/04* (2013.01)

(56) References Cited

FOREIGN PATENT DOCUMENTS

| | | | |
|---|---|---|---|
| JP | H05-112260 A | 5/1993 |
| JP | H05-294259 A | 11/1993 |
| JP | 2007-153138 A | 6/2007 |
| JP | 2008-037123 A | 2/2008 |
| JP | 4811179 B2 | 11/2011 |
| JP | 2013-136275 A | 7/2013 |
| JP | 2013-141849 A | 7/2013 |

\* cited by examiner

OUT ←――――→ IN

OUT ← → IN

AUTOMOBILE BODY STRUCTURE

TECHNICAL FIELD

The present invention relates to an automobile body structure in which a CFRP cabin formed of a bathtub shape is equipped with an inverted U-shaped roll bar providing a connection between front parts of a pair of left and right side frames, and a pair of left and right roll bar-supporting bars connecting an upper portion of the roll bar to rear parts of the pair of left and right side frames.

BACKGROUND ART

An arrangement in which a bathtub-shaped automobile cabin equipped with a floor panel, a pair of left and right side sills, a pair of left and right rear frames, a dash panel lower, a rear cross member, etc. is integrally formed by joining a CFRP outer skin and inner skin by means of a joining flange on the outer periphery is known from Patent Document 1 below.

Furthermore, an arrangement in which a movable roof is disposed in front of a roll bar provided in a rear part of a vehicle compartment, a luggage door having its rear end openably and closably supported on a main body via a hinge is disposed to the rear of the roll bar, and in a state in which the luggage door is opened to the rear the movable roof is moved and housed in a cargo compartment is known from Patent Document 2 below.

Moreover, an arrangement in which a CFRP back door opening panel integrally having an upper back, a C pillar, and a rear header surrounding a back door (tailgate panel), etc. is incorporated into a CFRP underbody is known from Patent Document 3 below.

Furthermore, an arrangement in which a step garnish is made mountable by forming a groove for mounting a component in an upper face of a side sill formed from an extruded aluminum alloy, etc. material without machining a mounting hole is known from Patent Document 4 below.

Moreover, an arrangement in which a kicking plate (step garnish) having an L-shaped cross section is mounted over an upper face and an outer face in the vehicle width direction of a side sill, and a weather strip sealing a gap between the kicking plate and an inner face in the vehicle width direction of a door panel is provided on the kicking plate is known from Patent Document 5 below.

RELATED ART DOCUMENTS

Patent Documents

Patent Document 1: Japanese Patent Application Laid-open No. 2013-136275
Patent Document 2: Japanese Patent Application Laid-open No. 2007-153138
Patent Document 3: Japanese Patent No. 4811179
Patent Document 4: Japanese Patent Application Laid-open No. 5-112260
Patent Document 5: Japanese Patent Application Laid-open No. 5-294259

SUMMARY OF THE INVENTION

Problems to be Solved by the Invention

When a rear part of a roof panel and a front part of a tailgate panel are supported on a CFRP cabin, it is necessary to support the roof panel and the tailgate panel strongly by means of a simple structure. When an inverted U-shaped roll bar is provided in a CFRP cabin and a rear part of a roof panel is supported on an upper portion of the roll bar, it is necessary to support the roof panel strongly in a similar manner.

Furthermore, in a vehicle equipped with a CFRP cabin formed of a bathtub shape, the cross-sectional area of a side sill is large in order to ensure the strength; the height of an upper face of the side sill therefore becomes high with respect to the floor panel, and there is a possibility that the ease with which an occupant can get in and out will be impaired.

Moreover, when a CFRP or metal side outer panel is supported on such a CFRP cabin, if a special mounting bracket, etc. is used, the weight or the number of components increases, and it is therefore necessary to strongly fix the side outer panel by means of a simple structure.

The present invention has been accomplished in light of the above circumstances, and it is an object thereof to support a rear part of a roof panel on a roll bar of a CFRP cabin strongly by means of a simple and lightweight structure, thus enhancing the ease with which an occupant can get in and out from a vehicle equipped with a bathtub shaped CFRP cabin, and to support a side outer panel on a CFRP cabin strongly by means of a simple and lightweight structure.

Means for Solving the Problems

In order to attain the above object, according to a first aspect of the present invention, there is provided an automobile body structure in which a CFRP cabin formed of a bathtub shape comprises an inverted U-shaped roll bar providing a connection between front parts of a pair of left and right side frames, and a pair of left and right roll bar-supporting bars connecting an upper portion of the roll bar to rear parts of the pair of left and right side frames, wherein a rear part of a roof panel and a front part of a tailgate panel are supported on a mounting bracket provided on the roll bar-supporting bar.

Further, according to a second aspect of the present invention, in addition to the first aspect, the rear part of the roof panel and the front part of the tailgate panel are together fastened to an upper wall of the mounting bracket by a bolt.

Furthermore, according to a third aspect of the present invention, in addition to the first aspect, the rear part of the roof panel and a tailgate hinge are together fastened to an upper wall of the mounting bracket by a bolt, and the front part of the tailgate panel is pivotably supported on the tailgate hinge.

Moreover, according to a fourth aspect of the present invention, in addition to any one of the first to third aspects, the mounting bracket is a member having a squared U-shaped cross section opening downward while comprising a front wall, an upper wall, and a rear wall when viewed in a vehicle width direction, the mounting bracket comprising a flange that is continuously connected to an outer peripheral face from an upper face to a vehicle width direction inner face of the roll bar-supporting bar, which has a hollow pipe shape.

Further, according to a fifth aspect of the present invention, in addition to any one of the first to fourth aspects, the mounting bracket is provided at a position lower than the upper portion of the roll bar.

Furthermore, according to a sixth aspect of the present invention, in addition to any one of the first to fifth aspects, the structure comprises a rear combination lamp housing in a rear part of the cabin, and fixing means for fixing the tailgate panel at a closed position is provided on the rear combination lamp housing.

Moreover, according to a seventh aspect of the present invention, in addition to the first aspect, the rear part of the roof panel is supported on the roll bar via a front mounting plate and a rear mounting plate, the front mounting plate comprises a roll bar fixed portion fixed to the roll bar, a roof panel support portion extending forward from the roll bar fixed portion and supporting the roof panel, and a reinforcing rib connecting the roll bar fixed portion and the roof panel support portion, and the rear mounting plate comprises a roll bar fixed portion fixed to the roll bar, a roof panel support portion extending rearward from the roll bar fixed portion and supporting the roof panel, and a reinforcing rib connecting the roll bar fixed portion and the roof panel support portion.

Further, according to an eighth aspect of the present invention, in addition to the seventh aspect, the front mounting plate and the rear mounting plate are each formed by press forming a single CFRP sheet.

Furthermore, according to a ninth aspect of the present invention, in addition to the seventh or eighth aspect, the roof panel support portion of the front mounting plate extends forward from a lower part of a front wall of the roll bar, and the roof panel support portion of the rear mounting plate extends rearward from an upper part of a rear wall of the roll bar.

Moreover, according to a tenth aspect of the present invention, in addition to any one of the seventh to ninth aspects, a rear end of the roof panel is fixed to the mounting bracket on an outside in the vehicle width direction of the rear mounting plate.

Further, according to an eleventh aspect of the present invention, in addition to the tenth aspect, an upper part of a side outer panel covering an outside face in the vehicle width direction of the cabin is connected to the roof panel on the outside in the vehicle width direction of the mounting bracket.

Furthermore, according to a twelfth aspect of the present invention, in addition to the first aspect, the outside in the vehicle width direction of the cabin is covered with a side outer panel, the side outer panel comprises a side sill cover portion covering an upper wall, a vehicle width direction outer wall, and a lower wall of a side sill, a step portion protruding upward is formed on an upper face of the side sill cover portion, and a support member is disposed between the step portion and the upper wall of the side sill.

Moreover, according to a thirteenth aspect of the present invention, in addition to the twelfth aspect, an inner end in the vehicle width direction of the upper face of the side sill cover portion and the upper wall of the side sill are connected via an upper bracket having a crank-shaped cross section, and the inner end in the vehicle width direction of a lower face of the side sill cover portion and the lower wall of the side sill are connected via a lower bracket having a crank-shaped cross section.

Further, according to a fourteenth aspect of the present invention, in addition to the twelfth or thirteenth aspect, a width in the vehicle width direction of the step portion increases in going from a front end part toward a middle part in the fore-and-aft direction and then reduces in going from the middle part in a fore-and-aft direction toward a rear end part, the front end part is connected to a front flange of a door opening, and the rear end part is connected to a rear flange of the door opening.

Furthermore, according to a fifteenth aspect of the present invention, in addition to the fourteenth aspect, a front end of the step portion of the side sill cover portion is positioned further inside in the vehicle width direction than a door checker provided at a front end of a door.

Moreover, according to a sixteenth aspect of the present invention, in addition to any one of the twelfth to fifteenth aspects, the side outer panel integrally comprises a rear fender portion that is continuous rearward from the side sill cover portion, and a front end of the side sill cover portion is connected to a lower end of a hollow front pillar formed by joining an outer panel and an inner panel.

Further, according to a seventeenth aspect of the present invention, in addition to the first aspect, the pair of left and right side frames extend rearward from rear ends of a pair of left and right side sills while being biased to an inside in the vehicle width direction so as to bypass a rear wheel, and a vehicle width direction inner face of a side outer panel covering an outside in a vehicle width direction of the cabin and a vehicle width direction outer face of the side frame are connected via a rear fender inner panel, which is a sheet-form member covering an upper part of the rear wheel.

Furthermore, according to an eighteenth aspect of the present invention, in addition to the seventeenth aspect, the rear fender inner panel is connected to the vehicle width direction outer face of the side frame from the lower end of the roll bar to the lower end of the roll bar-supporting bar.

Moreover, according to a nineteenth aspect of the present invention, in addition to the eighteenth aspect, the rear fender inner panel is connected to the vehicle width direction outer face of the side frame continuously from a lower end of the roll bar to a lower end of the roll bar-supporting bar.

Further, according to a twentieth aspect of the present invention, in addition to any one of the seventeenth to nineteenth aspects, a bulge portion protruding upward along an upper face of the rear wheel is formed in an intermediate part in a fore-and-aft direction of the rear fender inner panel, and the bulge portion is connected to the vehicle width direction inner face of the side outer panel.

Furthermore, according to a twenty-first aspect of the present invention, in addition to the eighteenth or nineteenth aspect, an upper part of the side outer panel is connected to the roll bar or the roll bar-supporting bar via the mounting bracket.

A rear frame 15 of an embodiment corresponds to the side frame of the present invention, a stud bolt 29 of the embodiment corresponds to the bolt of the present invention, and a locking mechanism 35 of the embodiment corresponds to the fixing means of the present invention.

Effects of the Invention

In accordance with the first aspect of the present invention, the CFRP cabin formed of a bathtub shape includes the inverted U-shaped roll bar providing a connection between front parts of the pair of left and right side frames, and the pair of left and right roll bar-supporting bars connecting the upper portion of the roll bar to the rear parts of the pair of left and right side frames. Since the rear part of the roof panel and the front part of the tailgate panel are supported on the mounting bracket provided on the roll bar-supporting bar, it is possible, by changing the fore-and-aft position of the mounting bracket along the roll bar-supporting bar, to freely set the rear end position of the roof panel and the front end position of the tailgate panel and, moreover, it is possible to strongly support the roof panel and the tailgate panel.

Furthermore, in accordance with the second aspect of the present invention, since the rear part of the roof panel and the front part of the tailgate panel are together fastened to the upper wall of the mounting bracket by means of the bolt, it is possible to strongly fix the roof panel and the tailgate panel with a minimum number of components.

Moreover, in accordance with the third aspect of the present invention, since the rear part of the roof panel and the tailgate hinge are together fastened to the upper wall of the mounting bracket by means of the bolt and the front part of the tailgate panel is pivotably supported on the tailgate hinge, it is possible to strongly fix the roof panel with a minimum number of components and to pivotably support the tailgate panel so that it can be opened and closed.

Furthermore, in accordance with the fourth aspect of the present invention, since the mounting bracket is a member having a squared U-shaped cross section opening downward while including the front wall, the upper wall, and the rear wall when viewed in the vehicle width direction, and includes the flange continuously connected to the outer peripheral face from the upper face to the vehicle width direction inner face of the hollow pipe-shaped roll bar-supporting bar, not only is the strength of the mounting bracket itself enhanced, but the strength with which the mounting bracket is mounted on the roll bar-supporting bar is enhanced, thereby enabling the roof panel and the tailgate panel to be more strongly supported.

Moreover, in accordance with the fifth aspect of the present invention, since the mounting bracket is provided at a position lower than the upper portion of the roll bar, it is possible to freely adjust the height of the mounting bracket so as to match the height of the tailgate panel.

Furthermore, in accordance with the sixth aspect of the present invention, since the cabin includes in its rear part the rear combination lamp housing, and the fixing means for fixing the tailgate panel at a closed position is provided on the rear combination lamp housing, it becomes possible to simplify the device for fixing the tailgate panel and improve the strength with which the tailgate panel is fixed.

Moreover, in accordance with the seventh aspect of the present invention, the inverted U-shaped roll bar provides a connection between the pair of left and right side frames of the CFRP cabin formed of a bathtub shape, and the rear part of the roof panel is supported on the roll bar via the front mounting plate and the rear mounting plate. Since the front mounting plate includes the roll bar fixed portion that is fixed to the roll bar, the roof panel support portion that extends forward from the roll bar fixed portion and supports the roof panel, and the reinforcing rib that connects the roll bar fixed portion and the roof panel support portion, and the rear mounting plate includes the roll bar fixed portion that is fixed to the roll bar, the roof panel support portion that extends rearward from the roll bar fixed portion and supports the roof panel, and the reinforcing rib that connects the roll bar fixed portion and the roof panel support portion, not only is it possible to strongly support the roof panel over a wide area via the front and rear roof panel support portions, but it is also possible, by reinforcing the front mounting plate and the rear mounting plate by means of the reinforcing rib, to enhance the strength with which the roof panel is mounted.

Furthermore, in accordance with the eighth aspect of the present invention, since the front mounting plate and the rear mounting plate are each formed by press forming a single CFRP sheet, it is possible to lighten the weight of the front mounting plate and the rear mounting plate and reduce the cost.

Moreover, in accordance with the ninth aspect of the present invention, since the roof panel support portion of the front mounting plate extends forward from the lower part of the front wall of the roll bar, and the roof panel support portion of the rear mounting plate extends rearward from the upper part of the rear wall of the roll bar, even if a step is formed so that the roof panel support portion of the front mounting plate is lower than the roof panel support portion of the rear mounting plate, and the thick roof panel having a sun roof, etc. provided thereon is fixed in front of the roll bar, it is possible to prevent a step from being formed in an upper face of the roof panel between the front and the rear of the roll bar.

Furthermore, in accordance with the tenth aspect of the present invention, since the pair of left and right roll bar-supporting bars are provided so as to connect the upper portion of the roll bar to the rear part of the pair of left and right side frames, the mounting bracket is provided so as to be fixed to the roll bar-supporting bar, and the rear end of the roof panel is fixed to the mounting bracket on the outside in the vehicle width direction of the rear mounting plate, it is possible by supporting the roof panel by means of the mounting bracket in addition to the front mounting plate and the rear mounting plate to further enhance the strength with which the roof panel is mounted.

Moreover, in accordance with the eleventh aspect of the present invention, since the upper part of the side outer panel covering the outside face in the vehicle width direction of the cabin is connected to the roof panel on the outside in the vehicle width direction of the mounting bracket, it is possible to fix the upper part of the side outer panel by utilizing the roof panel without requiring a special mounting bracket, etc.

Furthermore, in accordance with the twelfth aspect of the present invention, the outside in the vehicle width direction of the CFRP cabin formed of a bathtub shape while including the pair of left and right side sills is covered by the side outer panel. Since the side outer panel includes the side sill cover portion covering the upper wall, the vehicle width direction outer wall, and the lower wall of the side sill, the step portion protruding upward is formed on the upper face of the side sill cover portion, and the support member is disposed between the step portion and the upper wall of the side sill, even when the height of the upper face of the side sill is high, not only is it possible, by temporarily placing a foot or a hip on the step portion, to enhance the ease with which an occupant can get in and out, but it is also possible, by supporting the weight of an occupant with the support member, to prevent the step portion from being deformed.

Moreover, in accordance with the thirteenth aspect of the present invention, since the inner end in the vehicle width direction of the upper face of the side sill cover portion and the upper wall of the side sill are connected via the upper bracket having a crank-shaped cross section, and the inner end in the vehicle width direction of the lower face of the side sill cover portion and the lower wall of the side sill are connected via the lower bracket having a crank-shaped cross section, it is possible to assemble the side sill cover portion of the side outer panel on the side sill from the outside in the vehicle width direction, thereby improving the ease of assembly.

Furthermore, in accordance with the fourteenth aspect of the present invention, since the width W in the vehicle width direction of the step portion increases in going from the front end part toward the middle part in the fore-and-aft direction and then reduces in going from the middle part in the fore-and-aft direction toward the rear end part, the front end part is connected to the front flange of the door opening, and the rear end part is connected to the rear flange of the door opening, it is possible to continuously dispose the weather strip from the front flange of the door opening to the rear flange and the step portion while ensuring a sufficient width in the vehicle width direction for the middle part in the fore-and-aft direction of the step portion.

Moreover, in accordance with the fifteenth aspect of the present invention, since the front end of the step portion of the side sill cover portion is positioned further on the inside in the vehicle width direction than the door checker provided at the front end of the door, even for a door having a small height in the vertical direction, it is possible to ensure that there is space for providing the door checker at the front end of the door.

Furthermore, in accordance with the sixteenth aspect of the present invention, since the side outer panel integrally includes the rear fender portion that continues to the rear of the side sill cover portion and the front end of the side sill cover portion is connected to the lower end of the hollow front pillar formed by joining the outer panel and the inner panel, it is possible to integrate the side sill cover portion, the rear fender portion, and the front pillar and mount them on the bathtub-shaped cabin.

Moreover, in accordance with the seventeenth aspect of the present invention, the CFRP cabin formed of a bathtub shape includes the pair of left and right side sills extending in the fore-and-aft direction, and the pair of left and right side frames extending rearward from the rear ends of the pair of left and right side sills while being biased to the inside in the vehicle width direction so as to bypass the rear wheel. Since the vehicle width direction inner face of the side outer panel covering the outside in the vehicle width direction of the cabin and the vehicle width direction outer face of the side frame are connected via the rear fender inner panel, which is the sheet-form member covering the upper part of the rear wheel, not only is it possible to strongly fix the side outer panel to the cabin with a simple and lightweight structure without requiring a special mounting bracket, etc., but it is also possible to partition the wheel house of the rear wheel from the vehicle compartment with the rear fender inner panel.

Furthermore, in accordance with the eighteenth aspect of the present invention, since the cabin includes the inverted U-shaped roll bar providing a connection between the front parts of the pair of left and right side frames, and the pair of left and right roll bar-supporting bars connecting the upper portion of the roll bar to the rear parts of the pair of left and right side frames, and the rear fender inner panel is connected to the vehicle width direction outer face of the side frame from the lower end of the roll bar to the lower end of the roll bar-supporting bar, it is possible to enhance the stiffness of the vehicle body rear part by means of the roll bar, the roll bar-supporting bar, and the rear fender inner panel.

Moreover, in accordance with the nineteenth aspect of the present invention, since the rear fender inner panel is connected to the vehicle width direction outer face of the side frame continuously from the lower end of the roll bar to the lower end of the roll bar-supporting bar, it becomes possible to further enhance the stiffness of the vehicle body rear part and further improve the strength with which the rear fender inner panel is mounted.

Furthermore, in accordance with the twentieth aspect of the present invention, since the bulge portion protruding upward along the upper face of the rear wheel is formed in the intermediate part in the fore-and-aft direction of the rear fender inner panel, and the bulge portion is connected to the vehicle width direction inner face of the side outer panel, it is possible to avoid interference between the rear wheel and the rear fender inner panel, and it is possible to enhance the strength with which the rear fender inner panel is mounted on the vehicle width direction inner face of the side outer panel.

Moreover, in accordance with the twenty-first aspect of the present invention, since the upper part of the side outer panel is connected to the roll bar or the roll bar-supporting bar via the mounting bracket, it is possible, by utilizing the strong roll bar or roll bar-supporting bar, to enhance the strength with which the upper part of the side outer panel is mounted.

EXPLANATION OF REFERENCE NUMERALS AND SYMBOLS

Figure 1:
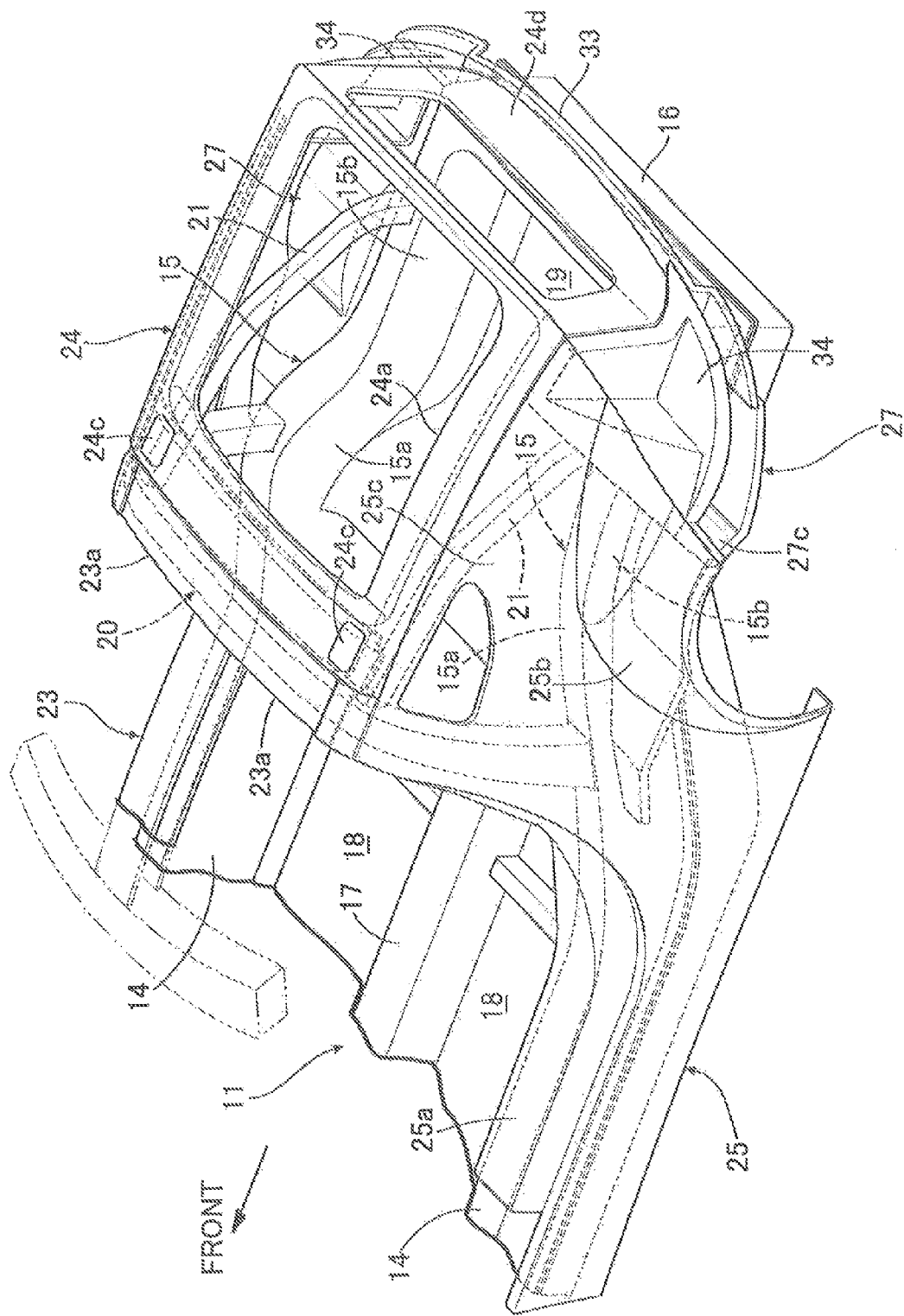
FIG. 1 is a perspective view of a rear part of a vehicle body of an automobile (first embodiment)

11 Cabin
14 Side sill
14a Upper wall
14b Vehicle width direction outer wall
14c Lower wall
15 Rear frame (side frame)
20 Roll bar
20b Upper portion
20c Front wall
20e Rear wall
21 Roll bar-supporting bar
22 Mounting bracket
22a Front wall
22b Upper wall
22c Rear wall
22e Flange
23 Roof panel
24 Tailgate panel
25 Side outer panel
25a Side sill cover portion
25b Rear fender portion
25d Step portion
25f Rear flange
25g Vehicle width direction inner face
26 Rear wheel
27 Rear fender inner panel
27c Bulge portion
29 Stud bolt (bolt)
30 Bolt
32 Tailgate hinge
34 Rear combination lamp housing
35 Locking mechanism (fixing means)
36 Front mounting plate
36a Roll bar fixed portion
36b Roof panel support portion
36c Reinforcing rib
37 Rear mounting plate
37a Roll bar fixed portion
37b Roof panel support portion
37c Reinforcing rib
38 Support member
39 Door
58 Door checker
131 Front pillar
131a Front flange
132 Outer panel
133 Inner panel
136 Upper bracket
137 Lower bracket
W Width in vehicle width direction of step part

MODES FOR CARRYING OUT THE INVENTION

Embodiments of the present invention are explained below by reference to the attached drawings. In the present specification, the fore-and-aft direction, the left-and-right direction (vehicle width direction), and the vertical direction are defined with reference to an occupant seated on a driving seat.

First Embodiment

A first embodiment of the present invention is now explained by reference to FIG. 1 to FIG. 5.

Figure 2:
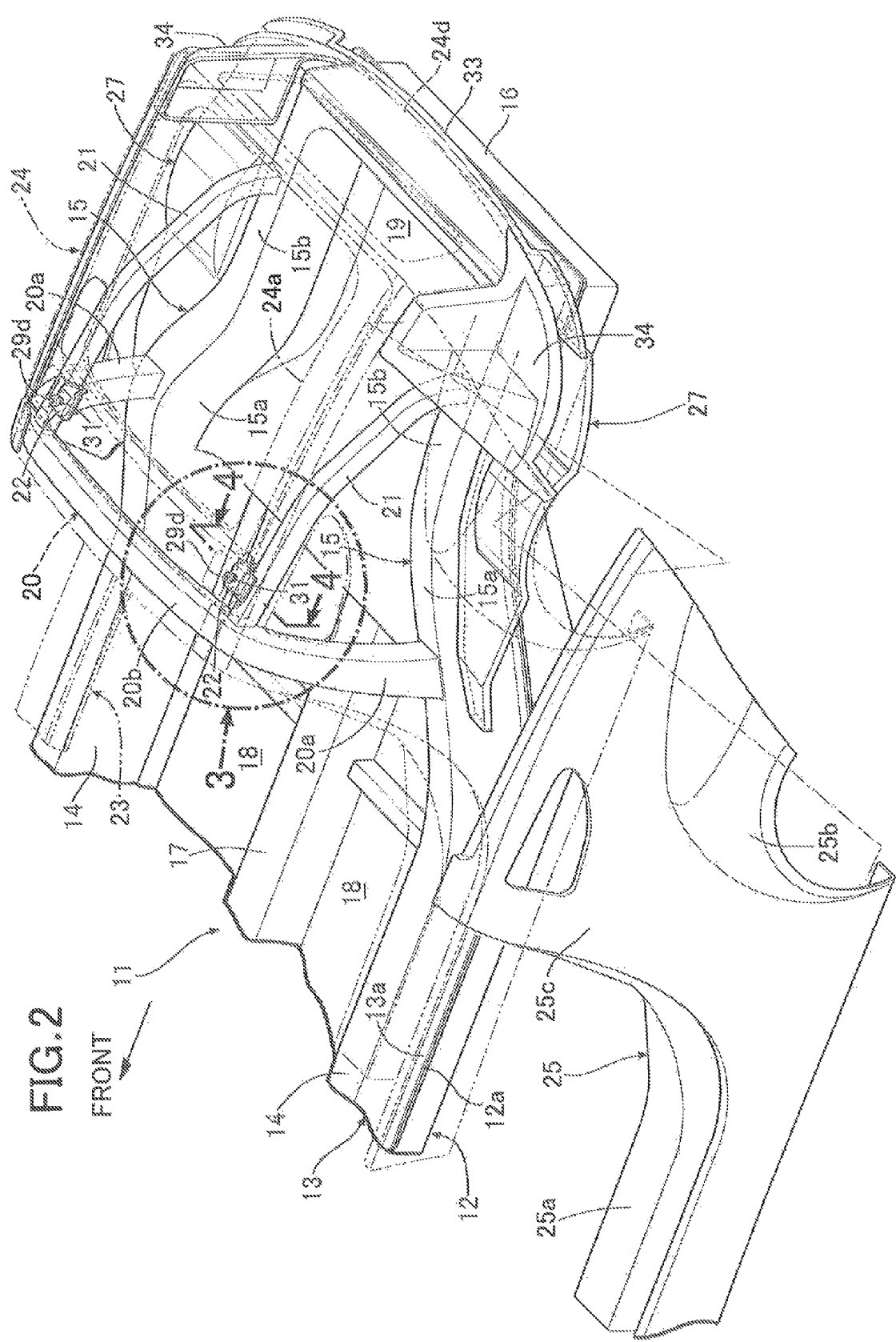
FIG. 2 is a partially exploded perspective view corresponding to FIG. 1. (first embodiment)
Figure 3:
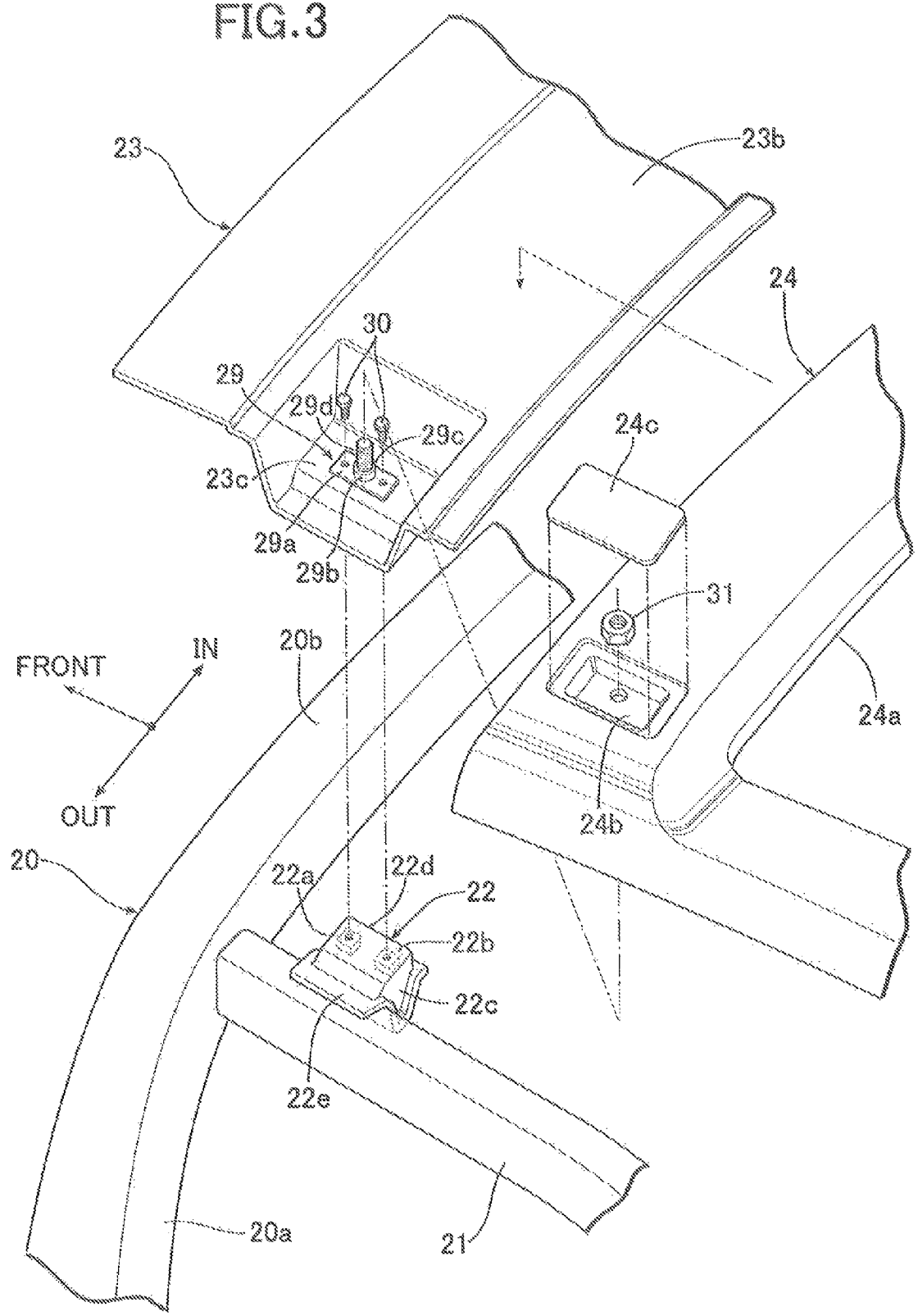
FIG. 3 is an exploded enlarged view of part 3 in FIG. 2. (first embodiment)
Figure 4:
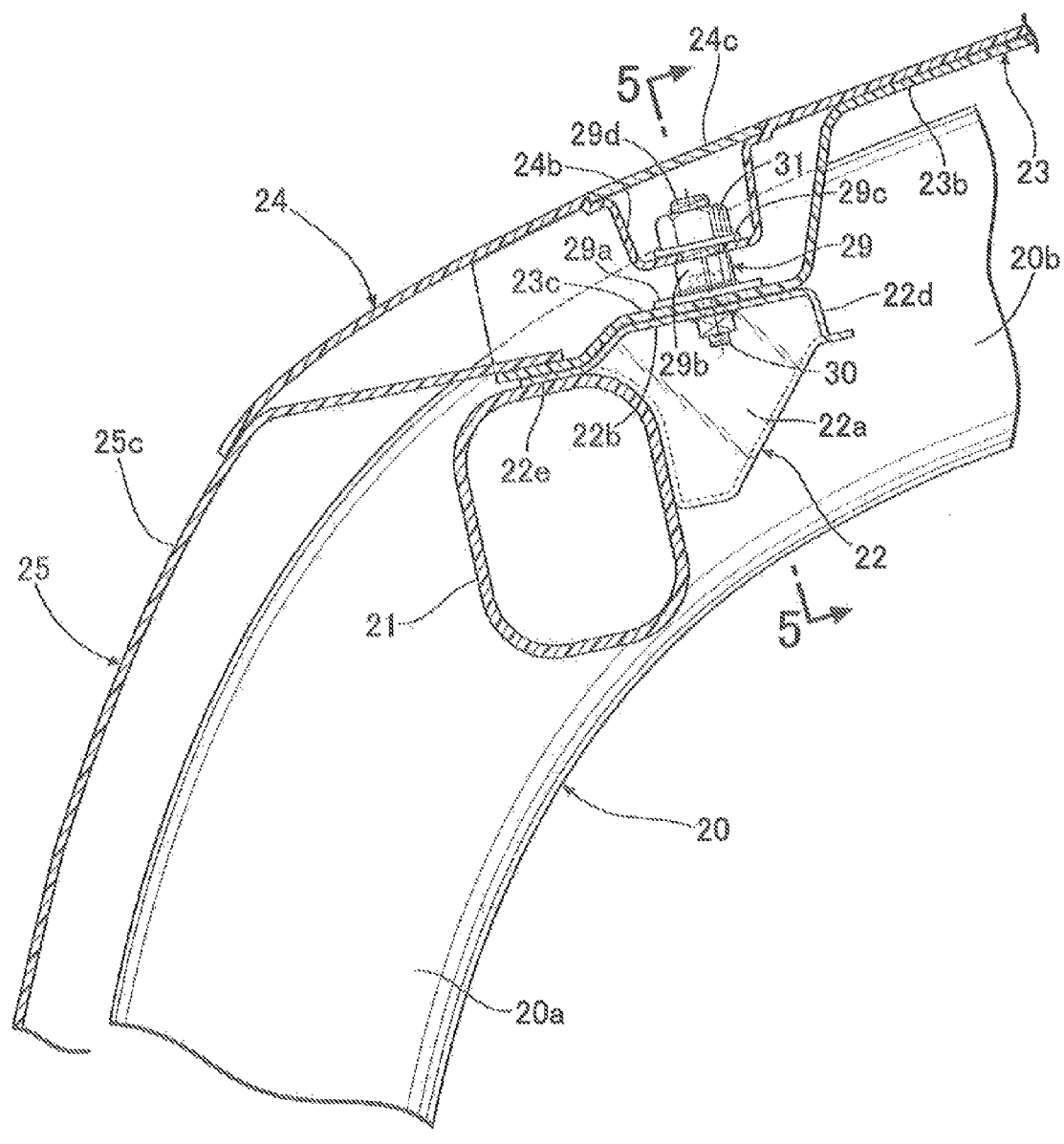
FIG. 4 is a sectional view along line 4-4 in FIG. 2. (first embodiment)
Figure 5:
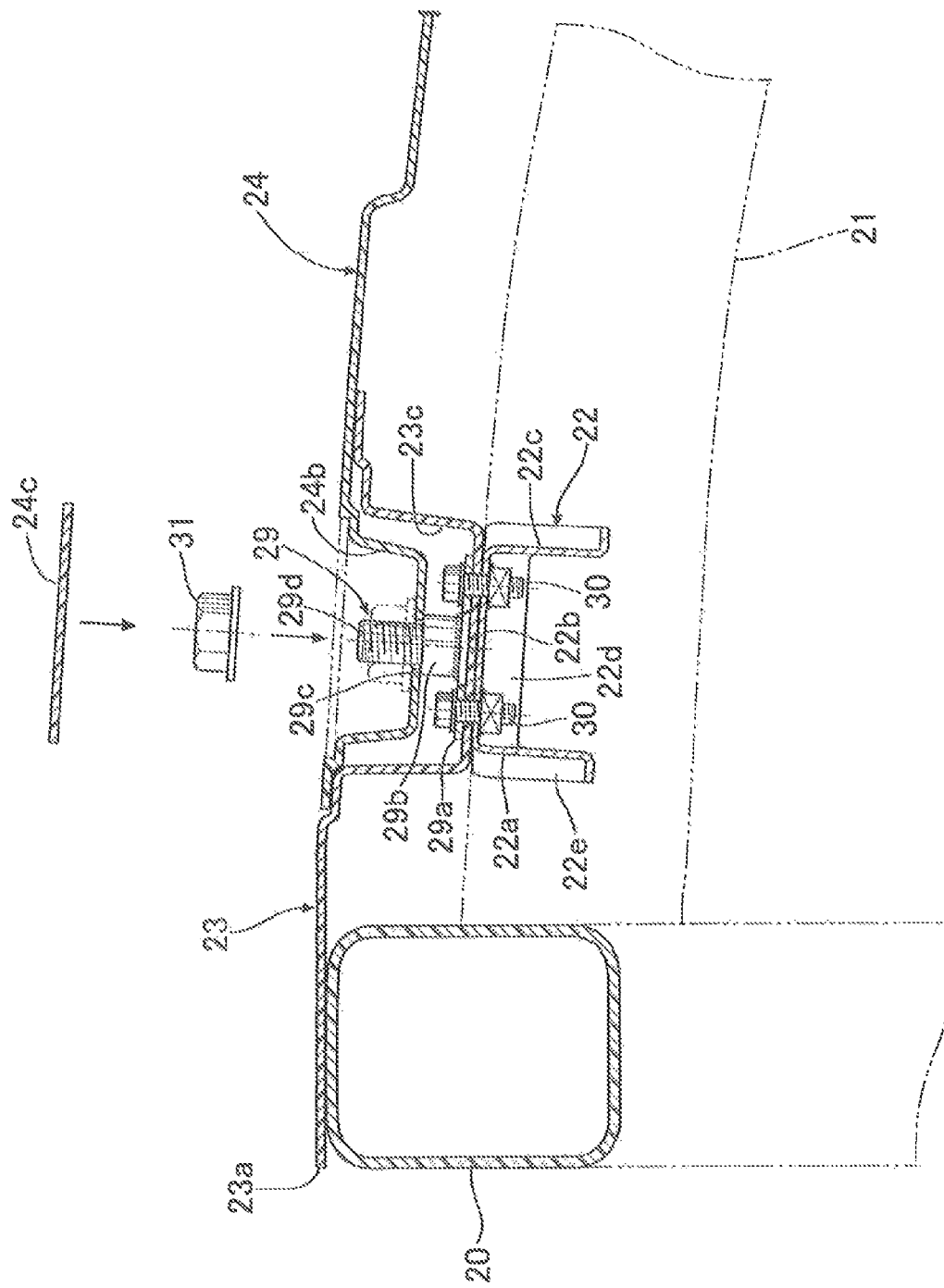
FIG. 5 is a sectional view along line 5-5 in FIG. 4. (first embodiment)

As shown in FIG. 1 and FIG. 2, an automobile cabin 11 formed of a bathtub shape using a CFRP (carbon fiber-reinforced plastic) is formed by joining an outer skin 12 positioned on the outside of a vehicle body and an inner skin 13 positioned on the inside of the vehicle body by means of joining flanges 12a and 13a formed on outer peripheral parts thereof. The cabin 11 includes a pair of left and right side sills 14 and 14 extending in the fore-and-aft direction along opposite side parts in the vehicle width direction, a pair of left and right rear frames 15 and 15 connected to the rear ends of the left and right side sills 14 and 14, and a rear end cross member 16 providing a connection between the rear ends of the left and right rear frames 15 and 15 in the vehicle width direction. The left and right side sills 14 and 14 are connected via a front floor panel 18 that includes, in a middle part in the vehicle width direction, a center tunnel 17 extending in the fore-and-aft direction, and the left and right rear frames 15 and 15 and the rear end cross member 16 are connected via a rear floor panel 19.

The rear frames 15 and 15 include a pair of left and right kick-up portions 15a and 15a bending inward in the vehicle width direction and upward from the rear ends of the side sills 14 and 14, and horizontal portions 15b and 15b extending linearly rearward from the rear ends of the kick-up portions 15a and 15a. Lower end parts of a pair of left and right side portions 20a and 20a of a roll bar 20 formed of an inverted U-shape using a CFRP pipe material are supported on upper faces of the left and right kick-up portions 15a and 15a. A pair of left and right roll bar-supporting bars 21 and 21, made of a CFRP pipe material, extend downward to the rear from opposite end parts in the vehicle width direction of an upper portion 20b of the roll bar 20, and lower end parts of the left and right roll bar-supporting bars 21 and 21 are supported on upper faces of the horizontal portions 15b and 15b of the left and right rear frames 15 and 15.

As shown in FIG. 2 to FIG. 5, a pair of left and right mounting brackets 22 and 22 press-formed using a metal sheet are provided on front parts of the left and right roll bar-supporting bars 21 and 21. The mounting bracket 22 is a member having a squared U-shaped cross section when viewed in the vehicle width direction, its lower face and outer face in the vehicle width direction are open while having a front wall 22a, an upper wall 22b, a rear wall 22c, and a vehicle width direction inner wall 22d. A flange 22e surrounding its outer peripheral part is fixed to an upper face and a vehicle width direction inner face of the roll bar-supporting bar 21 by bonding. The mounting bracket 22 is provided at a position lower than the upper portion 20b of the roll bar 20.

A CFRP roof panel 23 covering the front floor panel 18 from above is an H-shaped member having cutouts for a pair of left and right openings 23a and 23a for a sun roof. Its rear part is bonded to the upper portion 20b of the roll bar 20, and a pair of left and right recess portions 23c and 23c formed at opposite ends in the vehicle width direction of a protruding portion 23b protruding rearward from the upper portion 20b of the roll bar 20 are fixed to the upper walls 22b and 22b of the mounting brackets 22 and 22. A CFRP tailgate panel 24 disposed to the rear of the roof panel 23 includes in its center an opening 24a into which a rear window glass is fitted, and its front lower face is fixed to the upper walls 22b and 22b of the mounting brackets 22 and 22.

That is, a mounting plate 29a of a stud bolt 29 is fixed to the flat upper wall 22b of the mounting bracket 22 by means of two bolts 30 and 30 with the recess portion 23c of the roof panel 23 sandwiched therebetween. A male thread portion 29d is formed via a stepped portion 29c on the extremity of a shaft portion 29b extending upward from the mounting plate 29a. A front part of the tailgate panel 24 is fixed to the mounting bracket 22 by screwing a nut 31 around the male thread portion 29d in a state in which a recess portion 24b formed in the front part of the tailgate panel 24 is fitted into the recess portion 23c of the roof panel 23 and the male thread portion 29d extends through the recess portion 24b of the tailgate panel 24. The recess portion 24b of the tailgate panel 24 is covered by a cosmetic cover 24c so that the aesthetics are not impaired by the nut 31 being seen from the outside.

A CFRP side outer panel 25 covering left and right side parts of the rear part of the cabin 11 includes a side sill cover portion 25a bonded so as to cover the side sill 14, a rear fender portion 25b covering the outside in the vehicle width direction of a rear wheel (not illustrated), and a rear quarter panel portion 25c connected to the rear of the side sill cover portion 25a and the top of the rear fender portion 25b. The upper end of the rear quarter panel portion 25c is superimposed on and bonded to an upper face of the recess portion 23c of the roof panel 23 (see FIG. 4). That is, the upper end of the rear quarter panel portion 25c is supported indirectly on the mounting bracket 22 fixed to the roll bar-supporting bar 21 via the recess portion 23c of the roof panel 23. Furthermore, a vehicle width direction outer face of the rear frame 15 and a vehicle width direction inner face of the side outer panel 25 are connected via a rear fender inner panel 27, which is a sheet-form member made of a CFRP (see FIG. 2).

The operation of the first embodiment of the present invention having the above arrangement is now explained.

Since the CFRP cabin 11 includes the inverted U-shaped roll bar 20 providing a connection between the kick-up portions 15a and 15a of the pair of left and right rear frames 15 and 15, and the pair of left and right roll bar-supporting bars 21 and 21 connecting the upper portion 20b of the roll bar 20 to the horizontal portions 15b and 15b of the pair of left and right rear frames 15 and 15, and the rear part of the roof panel 23 and the front part of the tailgate panel 24 are supported on the mounting brackets 22 and 22 provided on the roll bar-supporting bars 21 and 21, which are reinforcing members, it is possible by changing the fore-to-aft position of the mounting brackets 22 and 22 along the roll bar-supporting bars 21 and 21 to freely set the rear end position of the roof panel 23 and the front end position of the tailgate panel 24 and, moreover, it is possible to strongly support the roof panel 23 and the tailgate panel 24.

Furthermore, since the mounting bracket 22 is a member having a squared U-shaped cross section opening downward while including the front wall 22a, the upper wall 22b, and the rear wall 22c when viewed in the vehicle width direction, and includes the flange 22e continuously connected to the outer peripheral face from the upper face to the vehicle width direction inner face of the roll bar-supporting bar 21, not only is the strength of the mounting bracket 22 itself enhanced, but the strength with which the mounting bracket 22 is mounted on the roll bar-supporting bar 21 is enhanced, thereby enabling the roof panel 23 and the tailgate panel 24 to be more strongly supported.

Moreover, since the rear part of the roof panel 23 is fixed to the upper wall 22b of the mounting bracket 22 via the mounting plate 29a of the stud bolt 29, and the front part of the tailgate panel 24 is fixed to the stepped portion 29c of the stud bolt 29 via the nut 31, it becomes possible to together fasten the rear part of the roof panel 23 and the front part of the tailgate panel 24 to the mounting bracket 22 using the stud bolt 29, thereby enabling the roof panel 23 and the tailgate panel 24 to be strongly fixed with a minimum number of components. Moreover, since the mounting bracket 22 is provided at a position lower than the upper portion 20b of the roll bar 20, it is possible to freely adjust the height of the mounting bracket 22 so as to match the height of the tailgate panel 24.

Second Embodiment

Figure 6:
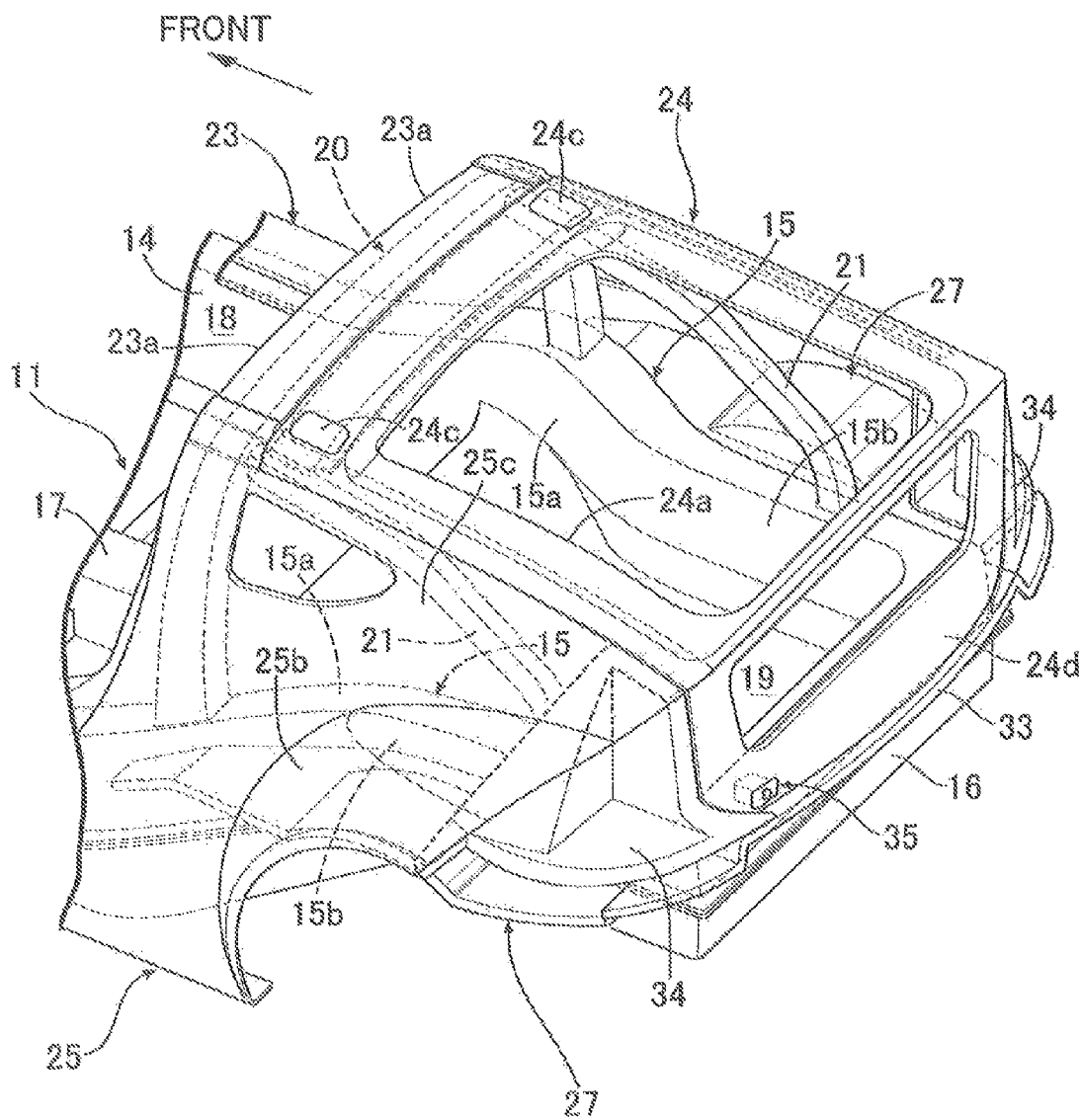
FIG. 6 is a view corresponding to FIG. 1. (second embodiment)
Figure 7:
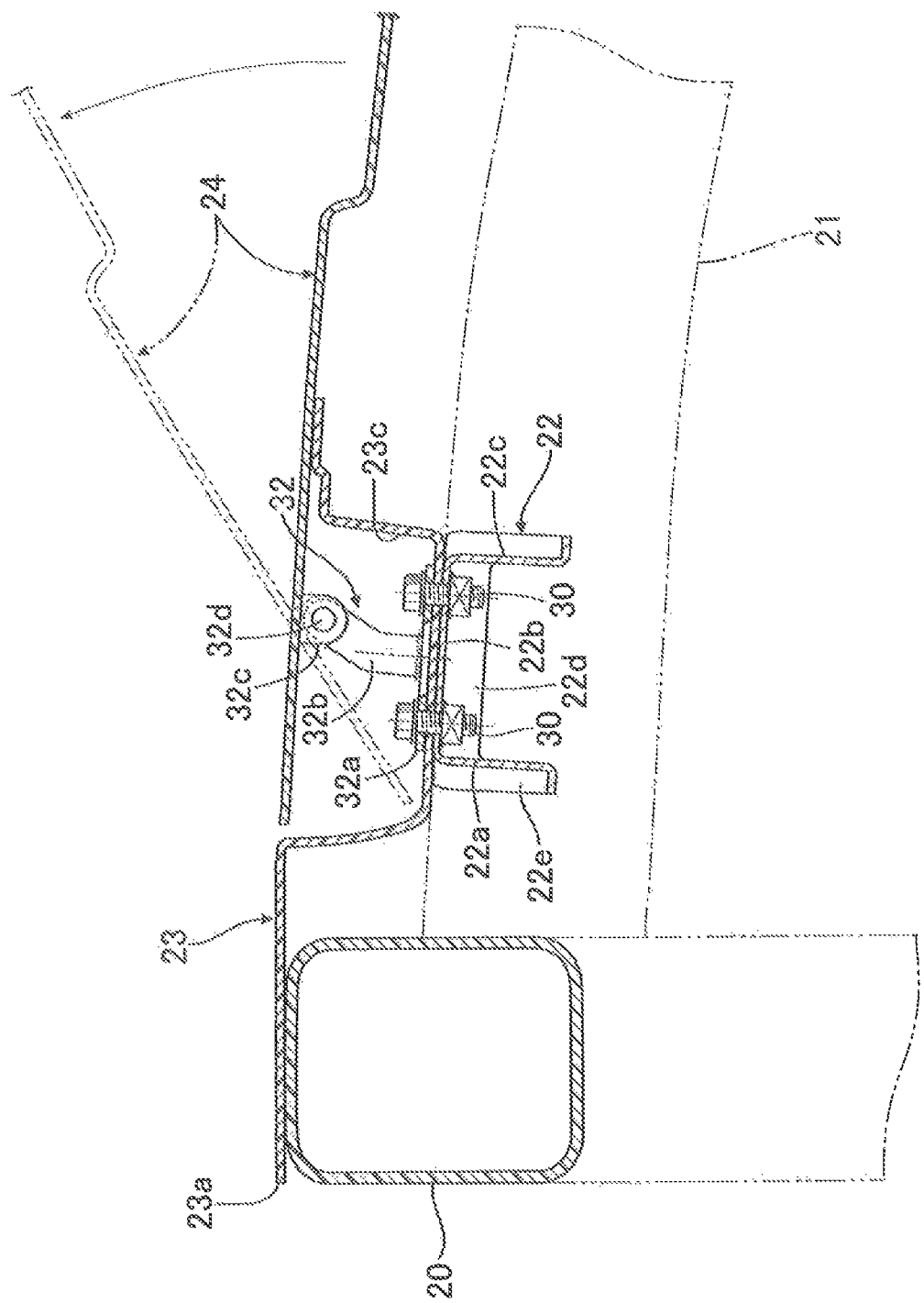
FIG. 7 is a view corresponding to FIG. 5. (second embodiment)
Figure 8:
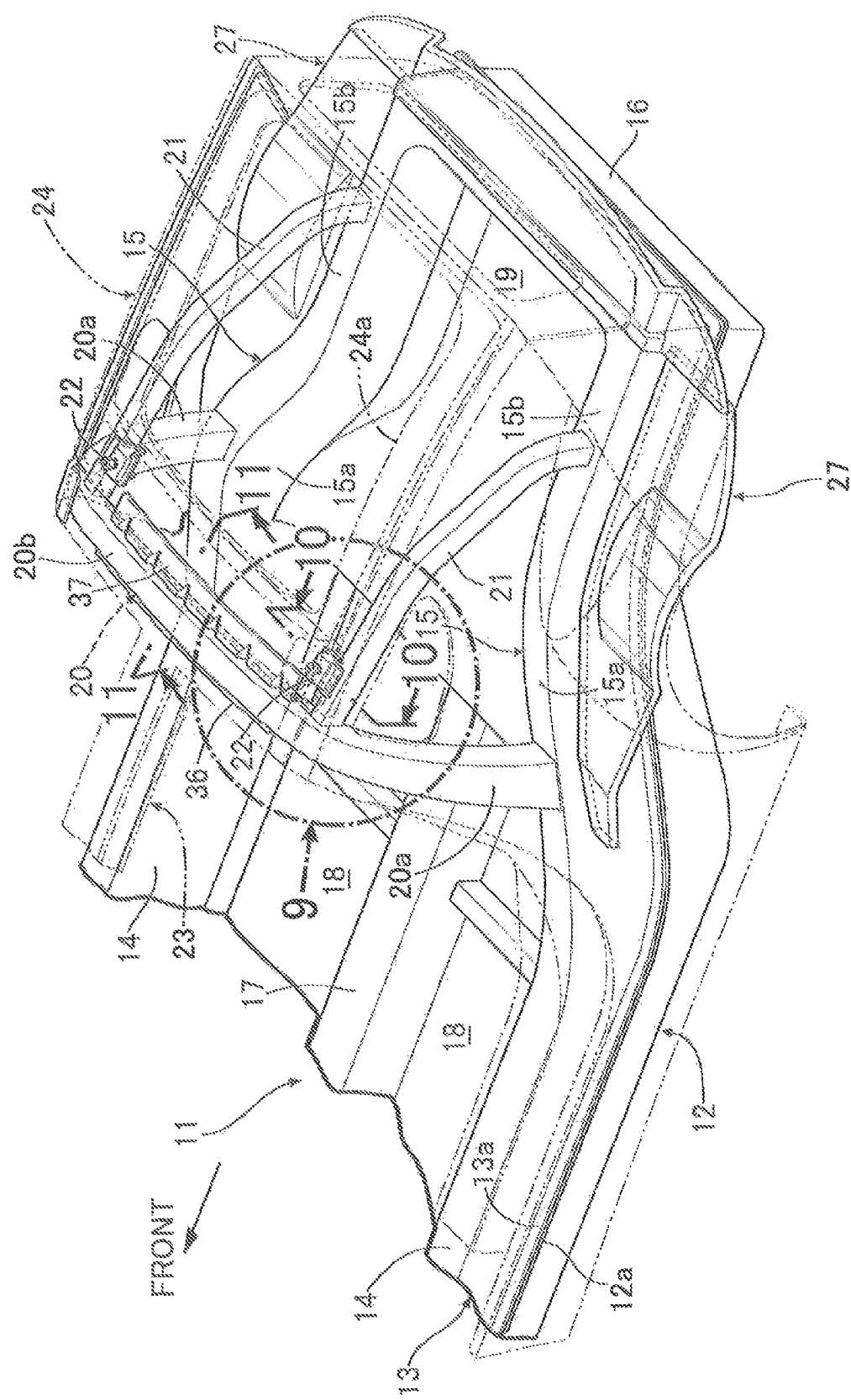
FIG. 8 is a partially exploded perspective view of a rear part of a vehicle body of an automobile as in FIG. 2. (third embodiment)
Figure 9:
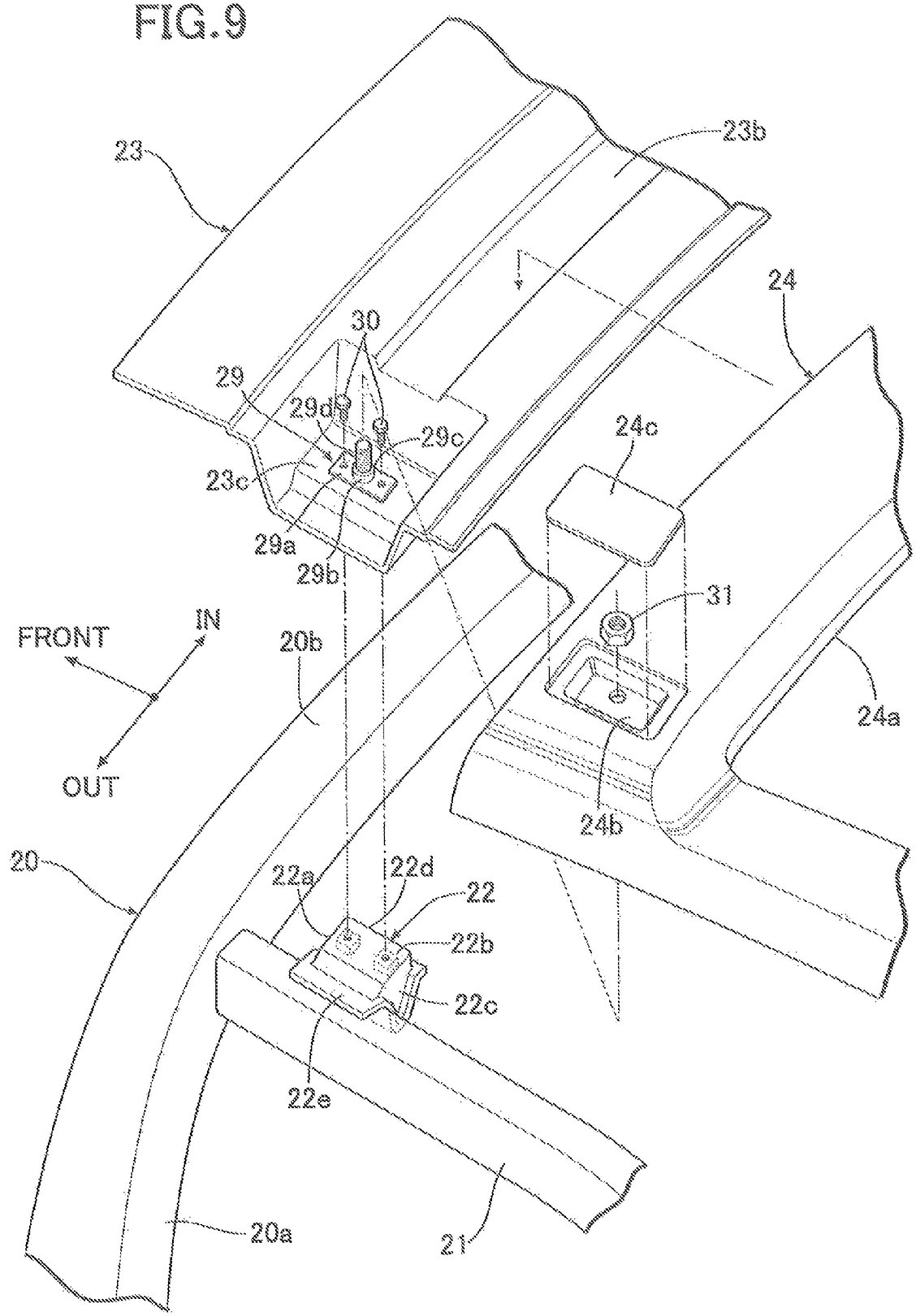
FIG. 9 is an exploded enlarged view of part 9 in FIG. 8. (third embodiment)
Figure 10:
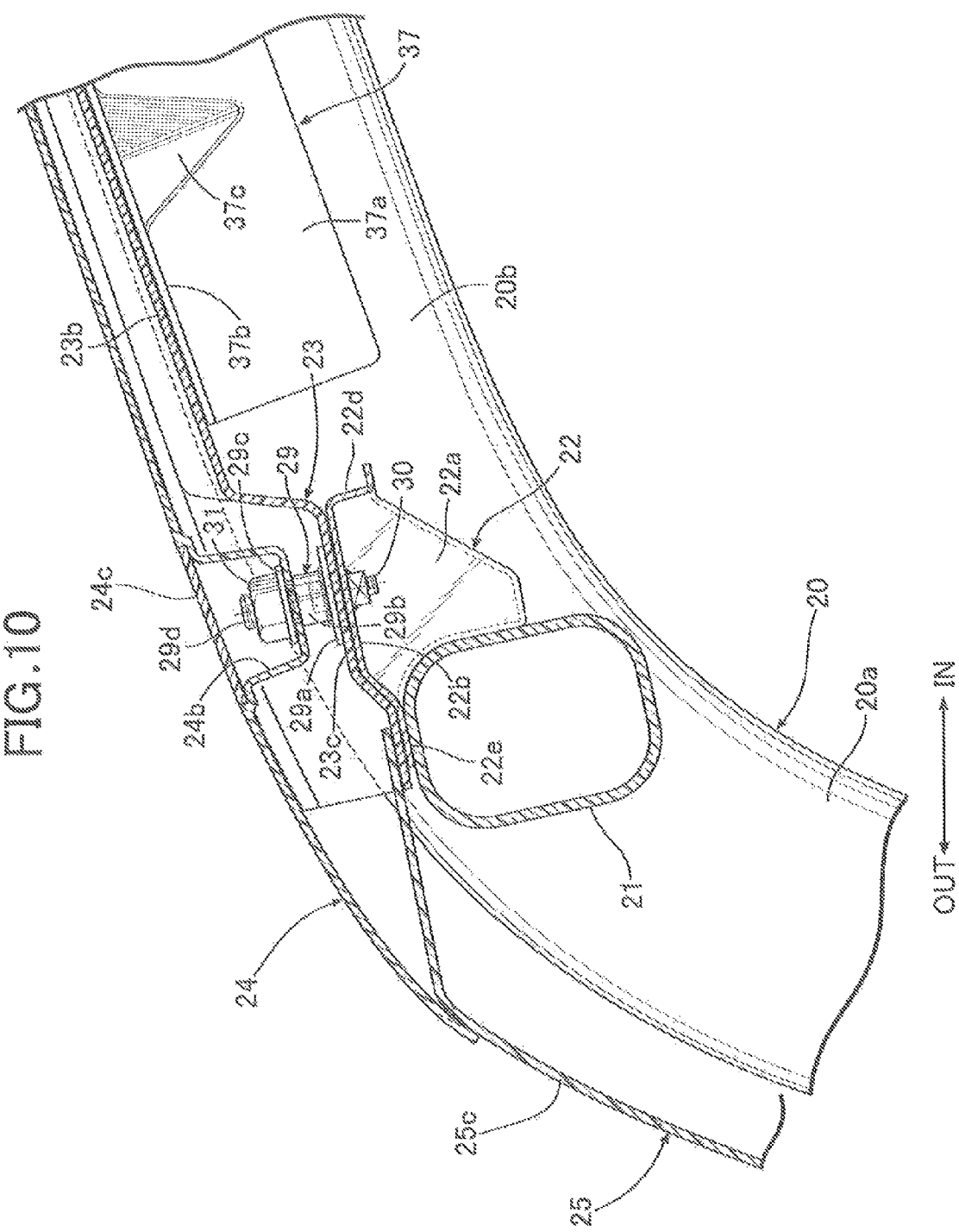
FIG. 10 is a sectional view along line 10-10 in FIG. 8. (third embodiment)
Figure 11:
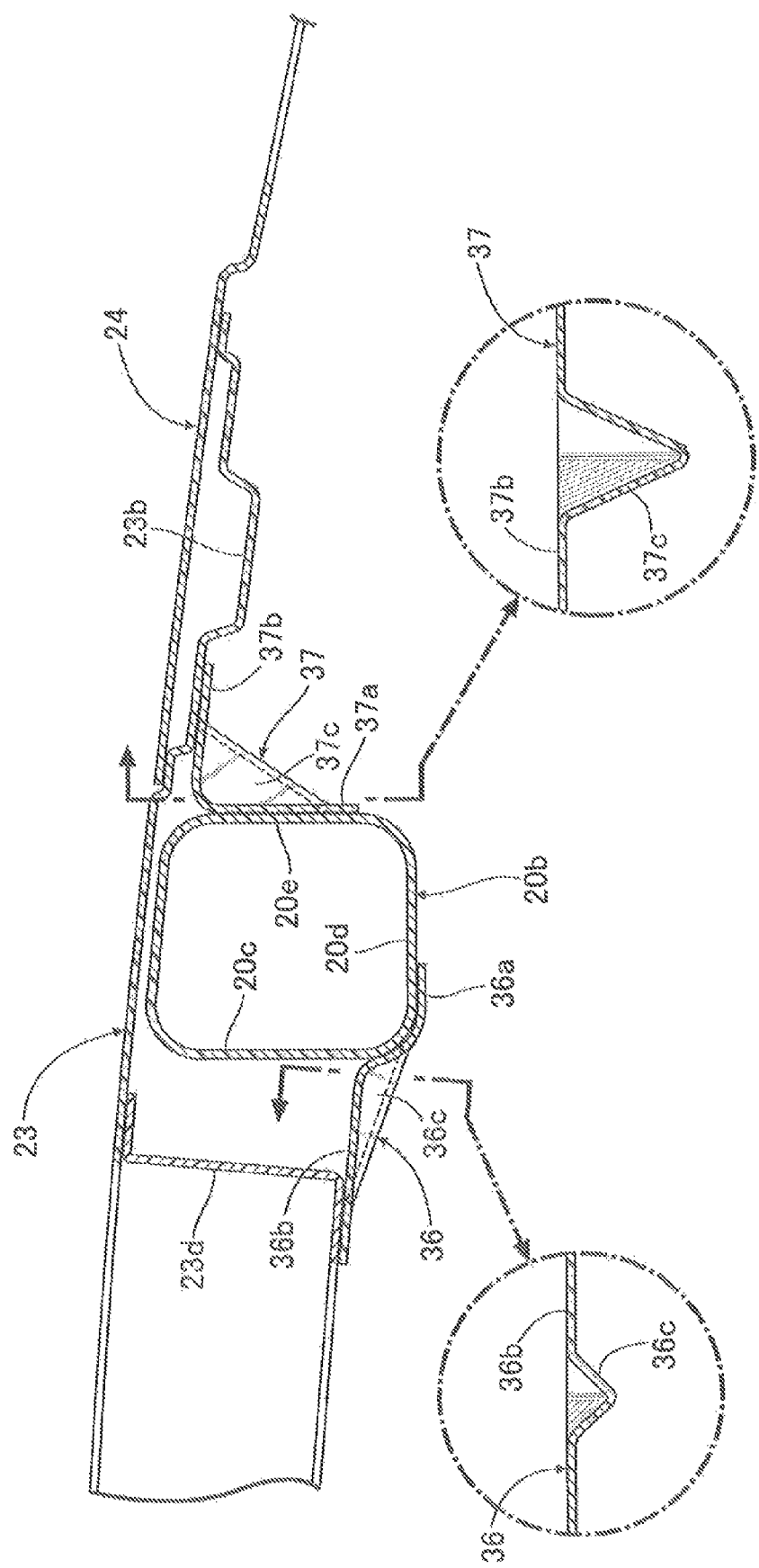
FIG. 11 is a sectional view along line 11-11 in FIG. 8. (third embodiment)
Figure 12:
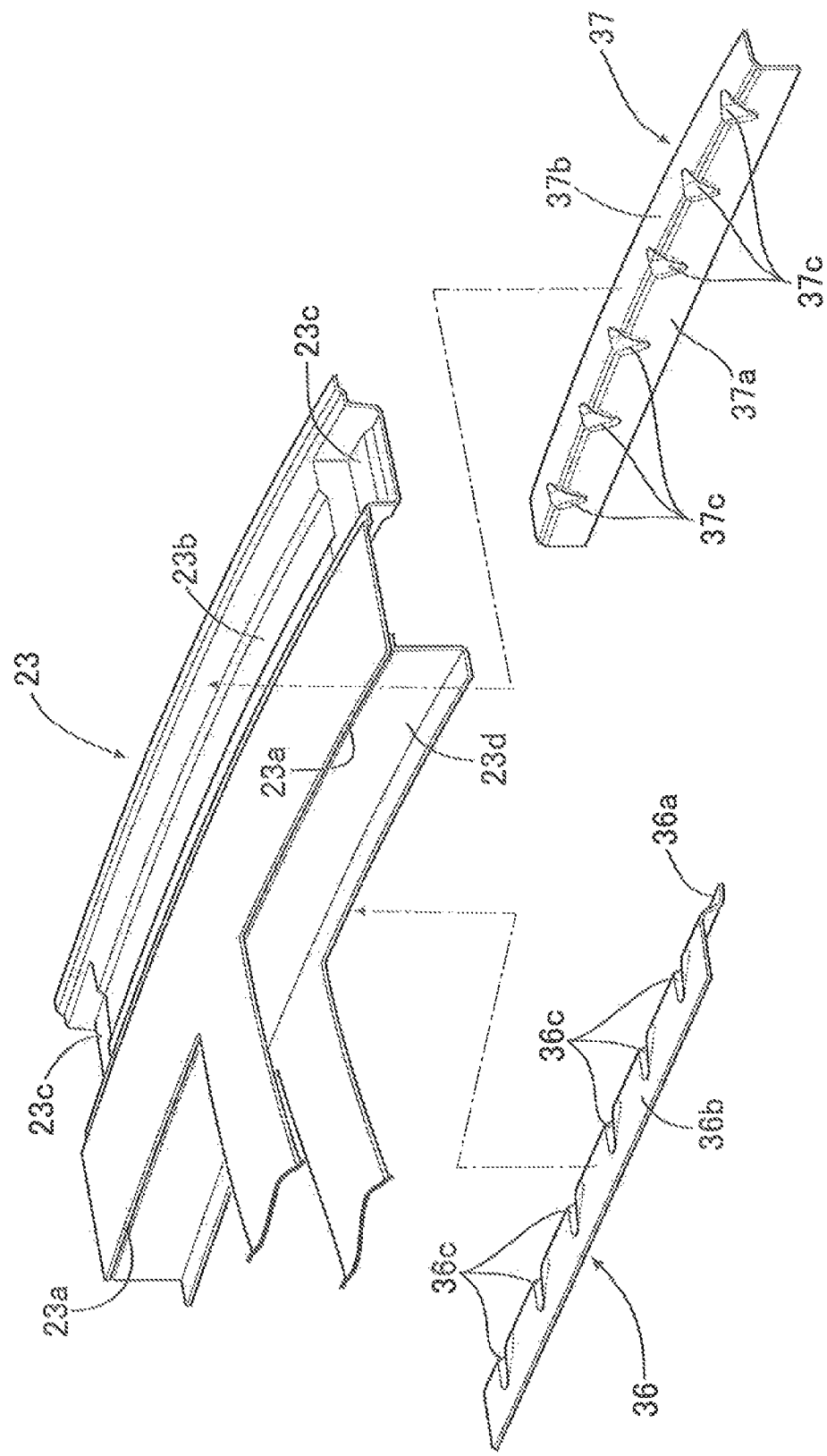
FIG. 12 is an exploded perspective view of a roof panel, a front mounting plate, and a rear mounting plate. (third embodiment)

A second embodiment of the present invention is now explained by reference to FIG. 6 and FIG. 7. Members corresponding to those in the first embodiment are denoted by the same reference numerals and symbols.

The tailgate panel 24 of the first embodiment is fixed so that it cannot be opened and closed, but with regard to a tailgate panel 24 of the second embodiment its front part is pivotably supported via a pair of left and right tailgate hinges 32 and 32 so that the tailgate panel 24 can be opened and closed in the vertical direction. The tailgate hinge 32 includes a mounting plate 32a, and this mounting plate 32a is fixed to an upper wall 22b of a mounting bracket 22 with a recess portion 23c of a roof panel 23 sandwiched therebetween by means of two bolts 30 and 30 in the same manner as for the mounting plate 29a of the stud bolt 29 described above. A fixed side hinge arm 32b rising from an upper face of the mounting plate 32a and a movable side hinge arm 32c fixed to a lower face of the tailgate panel 24 are linked by means of a pin 32d, thereby enabling a front part of the tailgate panel 24 to be pivotably supported on an upper face of the mounting bracket 22.

Opposite ends in the vehicle width direction of a rear end member 33 protruding rearward from a rear wall of a rear end cross member 13 are connected to rear ends of a pair of left and right rear fender inner panels 27 and 27. A pair of left and right rear combination lamp housings 34 and 34 are fixed so as to bridge the rear ends of the pair of left and right rear fender inner panels 27 and 27 and opposite ends in the vehicle width direction of the rear end member 33, and the lower end of a rear wall 24d extending downward from the rear end of the tailgate panel 24 is detachably fixed to one of the left and right rear combination lamp housings 34 by means of a known locking mechanism 35 formed from a striker and a latch.

In accordance with the present embodiment, since the recess portions 23c and 23c of the roof panel 23 and the mounting plates 32a and 32a of the tailgate hinges 32 and 32 are superimposed on the upper walls 22b and 22b of the mounting brackets 22 and 22 and together fastened by means of bolts 31, and a front part of a tailgate panel 25 is pivotably supported by the tailgate hinges 32 and 32, it is possible to strongly fix the roof panel 23 with a minimum number of components and pivotably support the tailgate panel 24 so that it can be freely opened and closed. Moreover, since the locking mechanism 35, which fixes the rear wall 24d of the tailgate panel 24 at a closed position, is provided on the rear combination lamp housing 34 provided in a rear part of a cabin 11, it becomes possible to simplify a device for fixing the tailgate panel 24 and improve the strength with which the tailgate panel 24 is fixed.

Third Embodiment

A third embodiment of the present invention is now explained by reference to FIG. 8 to FIG. 12. Members corresponding to those in the preceding embodiments are denoted by the same reference numerals and symbols, and a detailed explanation thereof is omitted, as is a description of the effects obtained.

A rear part of a roof panel 23 is supported on an upper portion 20b of a roll bar 20 via a front mounting plate 36 and a rear mounting plate 37 that are each formed by press forming a single CFRP sheet. The front mounting plate 36 includes a roll bar fixed portion 36a having an arc-shaped cross section bonded to the upper portion 20b of the roll bar 20 from a front wall 20c to a lower wall 20d, a substantially flat roof panel support portion 36b extending forward from the roll bar fixed portion 36a, and a plurality of reinforcing ribs 36c formed by indenting part of the roll bar fixed portion 36a and the roof panel support portion 36b into a bead shape having a triangular cross section. A frame portion 23d having a crank-shaped cross section forming the rear edge of an opening 23a for a sun roof is bonded to the rear part of the roof panel 23, and a lower face of the frame portion 23d is bonded to an upper face of the roof panel support portion 36b of the front mounting plate 36.

The rear mounting plate 37 includes a substantially flat roll bar fixed portion 37a bonded to a rear wall 20e of the upper portion 20b of the roll bar 20, a substantially flat roof panel support portion 37b extending rearward from the upper end of the roll bar fixed portion 37a, and a plurality of reinforcing ribs 37c formed by indenting part of the roll bar fixed portion 37a and the roof panel support portion 37b into a bead shape having a triangular cross section. A lower face of a panel-shaped protruding portion 23b of the rear part of the roof panel 23 is bonded to an upper face of the roof panel support portion 37b of the rear mounting plate 37.

The operation of the third embodiment of the present invention having the above arrangement is now explained.

The CFRP cabin 11 includes the inverted U-shaped roll bar 20 and a pair of left and right roll bar-supporting bars 21 and 21 in the same manner as in the preceding embodiments; when the rear part of the roof panel 23 is supported on the roll bar 20, which is a reinforcing member, via the front mounting plate 36 and the rear mounting plate 37, it is possible to strongly support the roof panel 23 over a wide area by means of the front and rear roof panel support portions 36b and 37b and to enhance the strength with which the roof panel 23 is mounted by reinforcing the front mounting plate 36 and the rear mounting plate 37 by means of the reinforcing ribs 36c, 37c.

Furthermore, since the front mounting plate 36 and the rear mounting plate 37 are each formed by press forming a single CFRP sheet, it is possible to lighten the weight of the front mounting plate 36 and the rear mounting plate 37 and reduce the cost. Moreover, since the roof panel support portion 36b of the front mounting plate 36 extends forward from the lower part of the front wall 20c of the roll bar 20, and the roof panel support portion 37b of the rear mounting plate 37 extends rearward from the upper part of the rear wall 20e of the roll bar 20, even if a step is formed so that the roof panel support portion 36b of the front mounting plate 36 is lower than the roof panel support portion 37b of the rear mounting plate 37 (see FIG. 11), and the thick roof panel 23 having a sun roof, etc. provided thereon is fixed in front of the roll bar 20, it is possible to prevent a step from being formed in an upper face of the roof panel 23 between the front and the rear of the roll bar 20.

Furthermore, since mounting brackets 22 and 22 are provided so as to be fixed to the roll bar-supporting bars 21 and 21, and the rear end of the roof panel 23 is fixed to the mounting brackets 22 and 22 on the outside in the vehicle width direction of the rear mounting plate 37, it is possible by supporting the roof panel 23 by means of the mounting brackets 22 and 22 in addition to the front mounting plate 36 and the rear mounting plate 37 to further enhance the strength with which the roof panel 23 is mounted.

Moreover, since an upper part of a side outer panel 25 covering the outside in the vehicle width direction of the cabin 11 is connected to the roof panel 23 on the outside in the vehicle width direction of the mounting bracket 22, it is possible to fix the upper part of the side outer panel 25 by utilizing the roof panel 23 without requiring a special mounting bracket, etc.

Fourth Embodiment

A fourth embodiment of the present invention is now explained by reference to FIG. 13 to FIG. 16. Members corresponding to those in the preceding embodiments are denoted by the same reference numerals and symbols, and a detailed explanation thereof is omitted.

Figure 13:
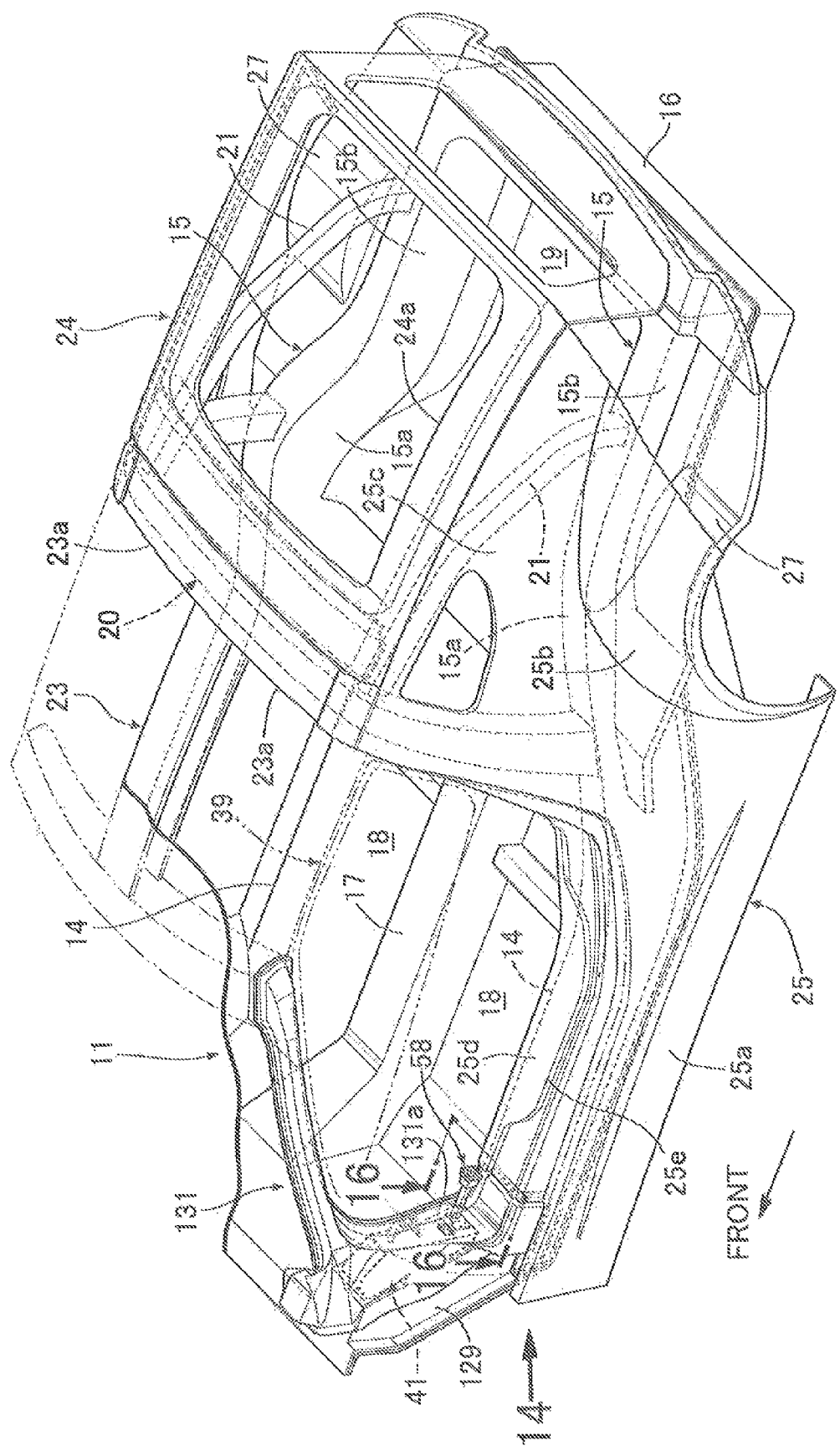
FIG. 13 is a perspective view of a vehicle body of an automobile. (fourth embodiment)
Figure 14:
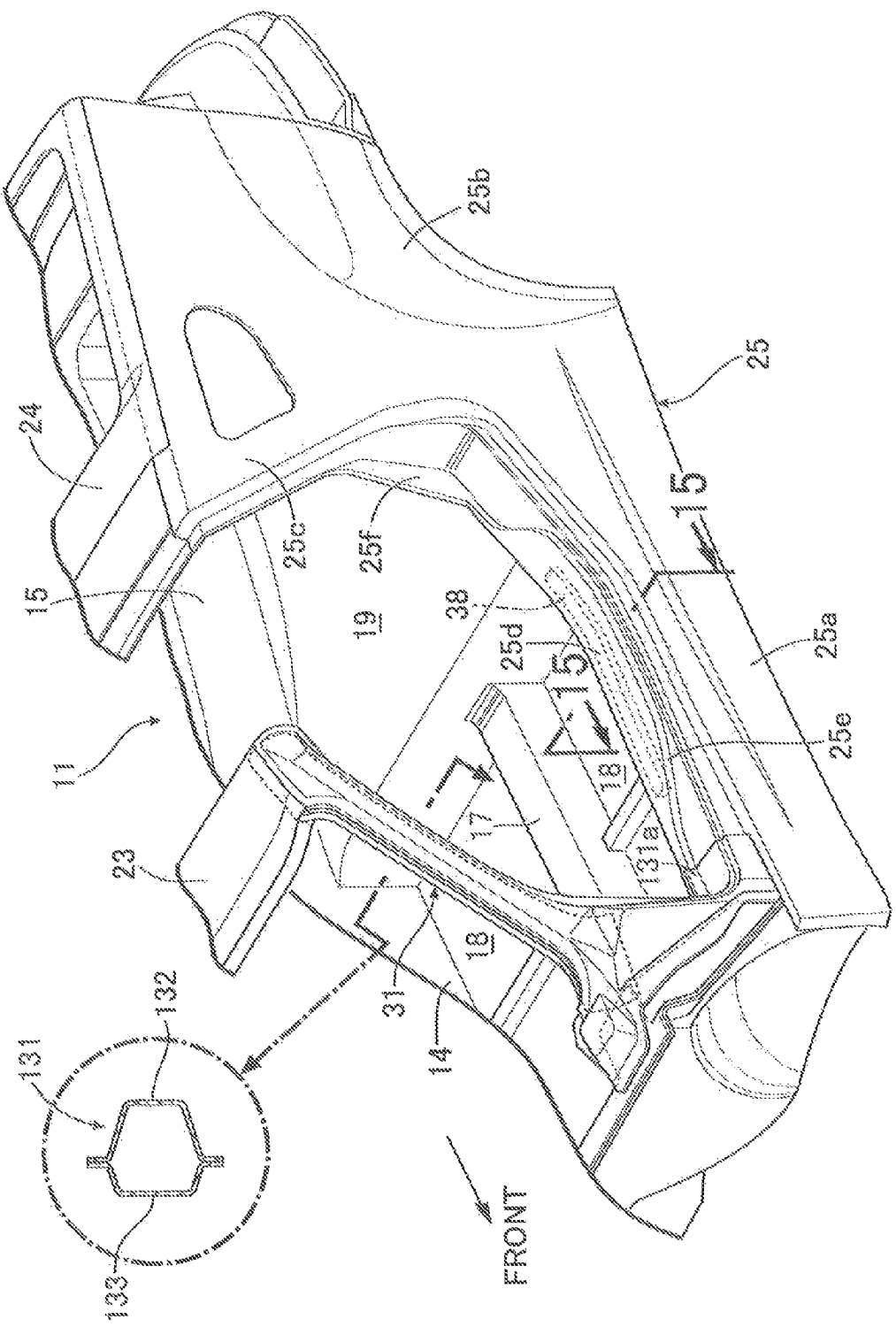
FIG. 14 is a view in the direction of arrow 14 in FIG. 13. (fourth embodiment)

As shown in FIG. 13 and FIG. 14, an automobile cabin 11 formed of a bathtub shape using a CFRP (carbon fiber-reinforced plastic) includes a pair of left and right side sills 14 and 14 extending in the fore-and-aft direction along opposite side parts in the vehicle width direction, a pair of left and right rear frames 15 and 15 connected to the rear ends of the left and right side sills 14 and 14, and a rear end cross member 16 providing a connection between the rear ends of the left and right rear frames 15 and 15 in the vehicle width direction. The left and right side sills 14 and 14 are connected via a front floor panel 18 including, in a middle part in the vehicle width direction, a center tunnel 17 extending in the fore-and-aft direction, and the left and right rear frames 15 and 15 and the rear end cross member 16 are connected via a rear floor panel 19.

A CFRP roof panel 23 covering the front floor panel 18 from above is an H-shaped member having cutouts for a pair of left and right openings 23a and 23a for a sun roof. Its front part is supported at upper ends of a pair of left and right CFRP front pillars 131 and 131, and its rear part is fixed to an upper portion 20b of a roll bar 20. The front pillar 131 is a member having a closed cross-section formed by joining an outer panel 132 and an inner panel 133, and the lower end thereof is connected to a rear face of a front pillar lower part 129 (see FIG. 16) rising from the front end of the side sill 14. A CFRP tailgate panel 24 disposed to the rear of the roof panel 23 includes in its center an opening 24a into which a rear window glass is fitted, and its front part is superimposed and supported on an upper face of the rear end of the roof panel 23.

A CFRP side outer panel 25 covering left and right side parts of the cabin 11 includes a side sill cover portion 25a, a rear fender portion 25b, and a rear quarter panel portion 25c in the same manner as in the proceeding embodiments. The upper end of the rear quarter panel portion 25c is superimposed on and bonded to an end part in the vehicle width direction of the rear part of the roof panel 23. Furthermore, a vehicle width direction outer face of the rear frame 15 and a vehicle width direction inner face of the side outer panel 25 are connected via a rear fender inner panel 27, which is a sheet-form member made of a CFRP.

Figure 15:
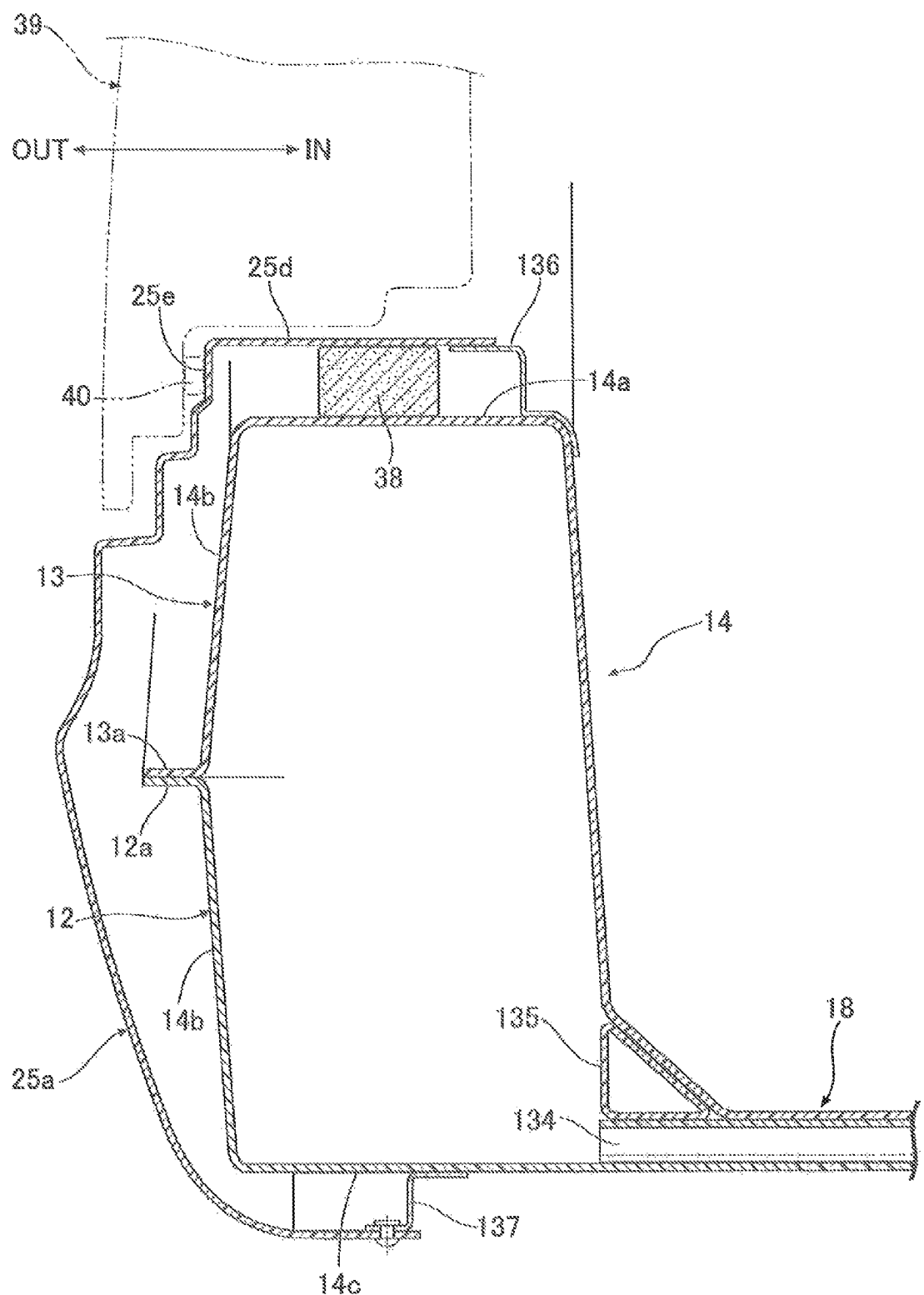
FIG. 15 is a sectional view along line 15-15 in FIG. 14. (fourth embodiment)

As shown in FIG. 15, the side sill 14 and the front floor panel 18 are formed so as to be hollow by joining an outer skin 12 and an inner skin 13 by means of joining flanges 12a and 13a, a corrugated core material 134 is disposed in the interior of the front floor panel 18, and a reinforcing member 135 formed from a pipe material having a triangular cross section is disposed on the border between the side sill 14 and the front floor panel 18.

The side sill cover portion 25a of the side outer panel 25 is formed of a C-shaped cross section so as to cover an upper wall 14a, a vehicle width direction outer wall 14b, and a lower wall 14c of the side sill 14. A step portion 25d extending in the fore-and-aft direction is projectingly provided on the upper face so as to face upward. The upper face of the side sill cover portion 25a, that is, the inner end in the vehicle width direction of the step portion 25d, is bonded to the upper wall 14a of the side sill 14 via an upper bracket 136 having a crank-shaped cross section, and the lower face of the side sill cover portion 25a is bonded to the lower wall 14c of the side sill 14 via a lower bracket 137 having a crank-shaped cross section. In this arrangement, a support member 38 extending in the fore-and-aft direction is disposed between an upper face of the upper wall 14a of the side sill 14 and a lower face of the step portion 25d of the side sill cover portion 25a.

Figure 16:
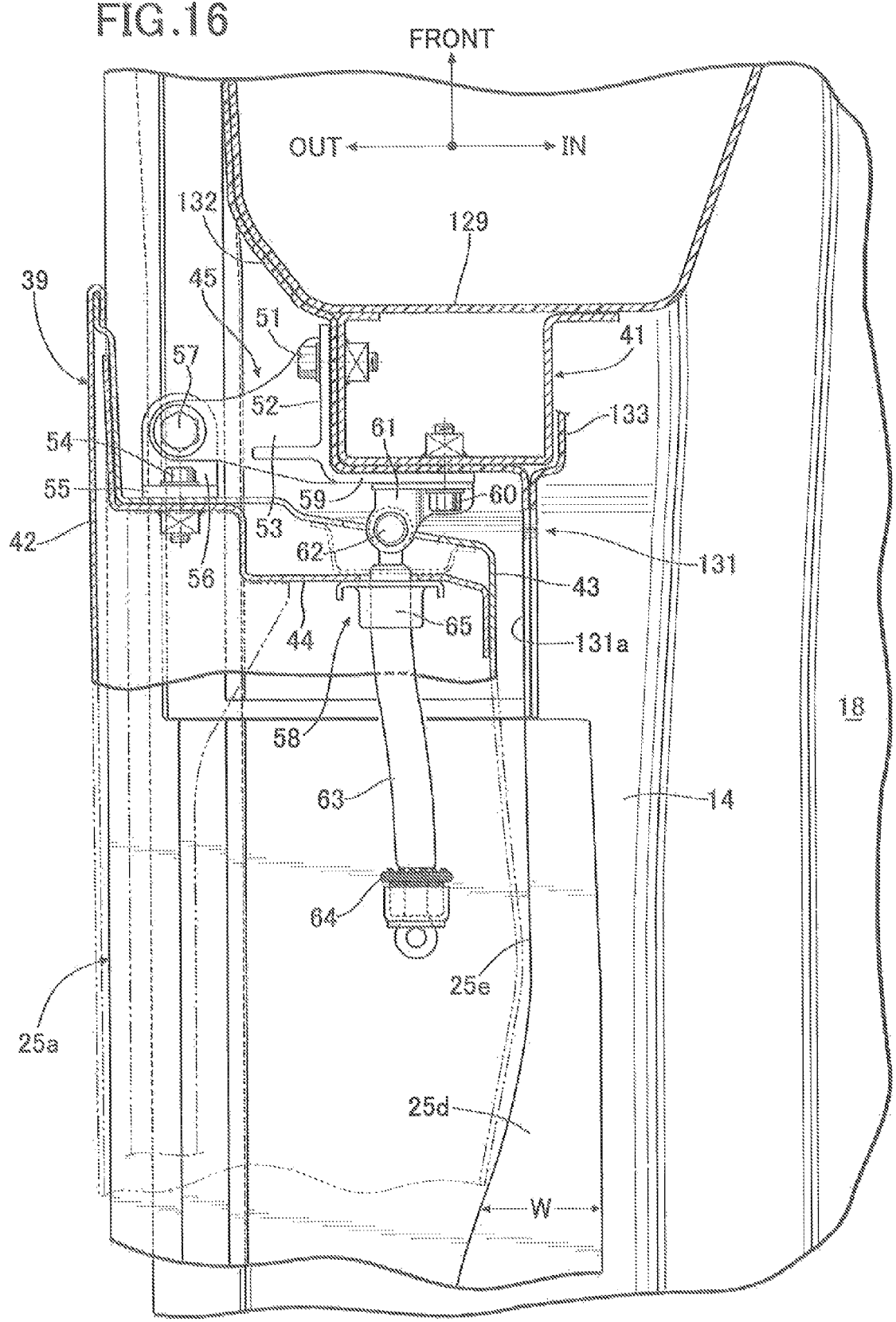
FIG. 16 is a sectional view along line 16-16 in FIG. 13. (fourth embodiment)
Figure 17:
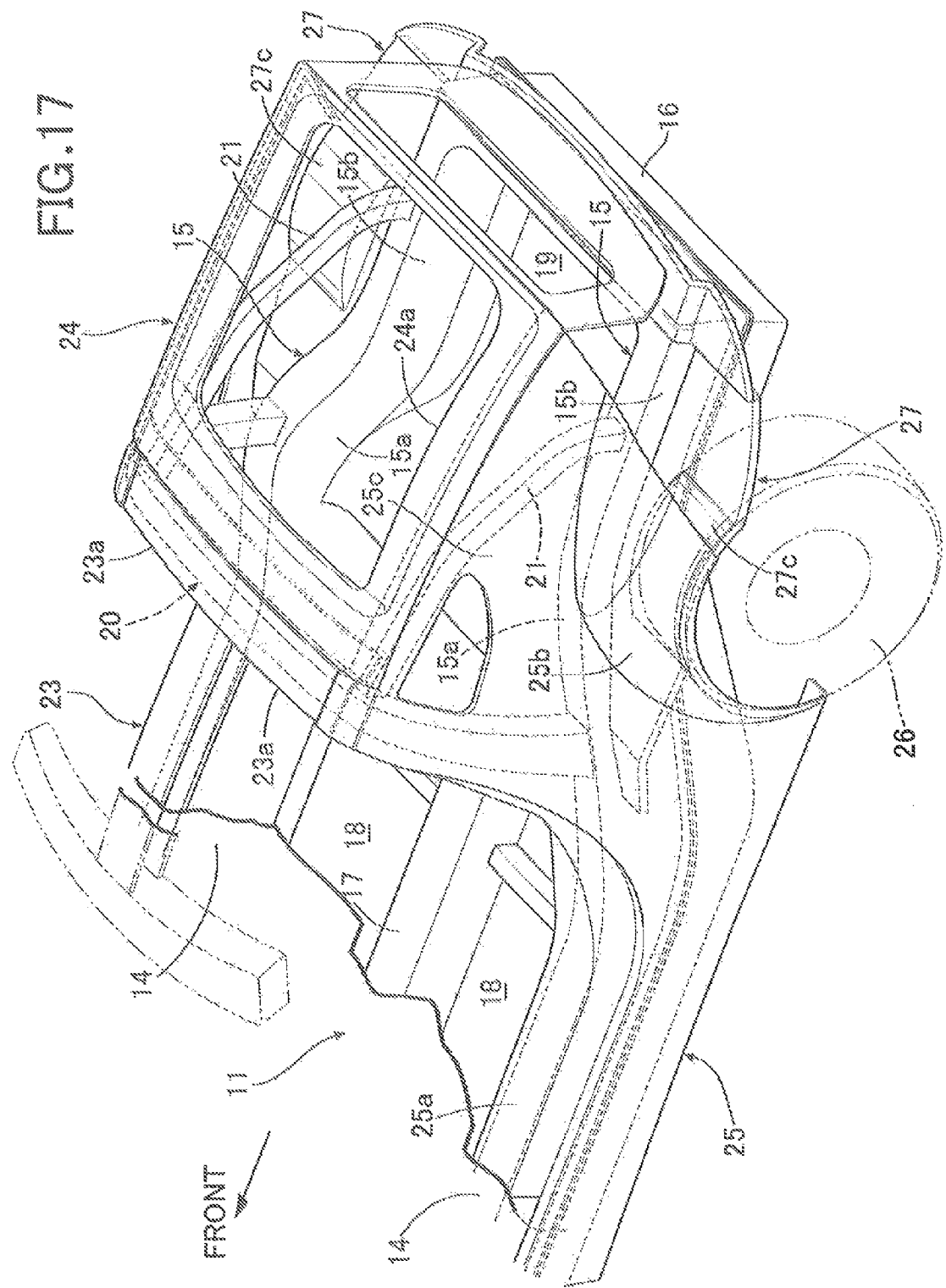
FIG. 17 is a perspective view of a rear part of a vehicle body of an automobile. (fifth embodiment)
Figure 18:
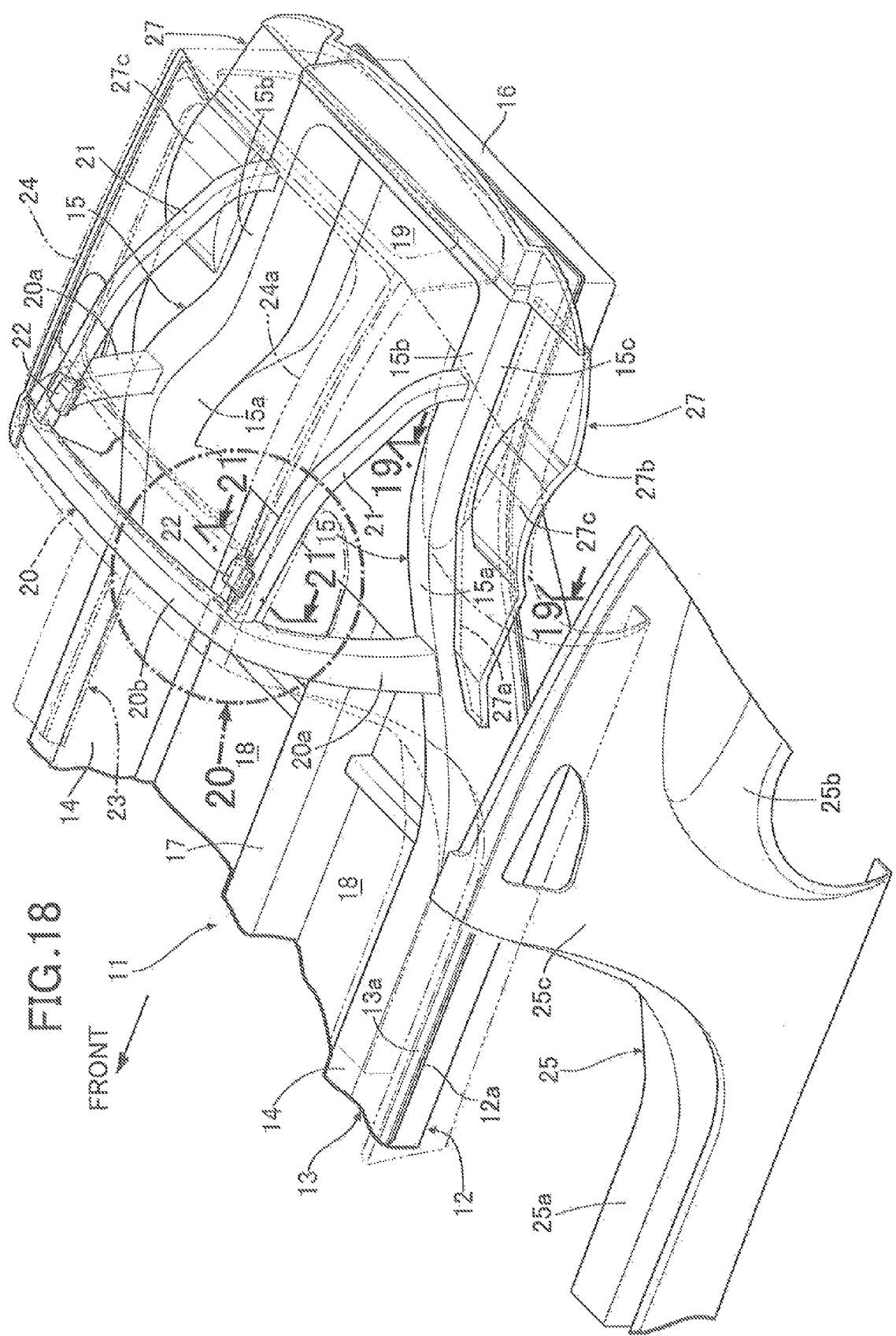
FIG. 18 a partially exploded perspective view corresponding to FIG. 17. (fifth embodiment)

As shown in FIG. 14 and FIG. 16, a width W (see FIG. 16) in the vehicle width direction of the step portion 25d of the side sill cover portion 25a of the side outer panel 25 is the greatest for an intermediate part in the fore-and-aft direction and decreases on the inside in the vehicle width direction in going toward a front end part and a rear end part. In other words, a stepped portion 25e at the outer end in the vehicle width direction of the step portion 25d protrudes outwardly in the vehicle width direction in going from a front end toward a middle part in the fore-and-aft direction and retreats inwardly in the vehicle width direction in going from the middle part in the fore-and-aft direction to a rear end part.

A CFRP door 39 is openably and closably disposed in a door opening defined by the side sill cover portion 25a, the front pillar 131, the outer edge in the vehicle width direction of the roof panel 23, and the front edge of the rear quarter panel portion 25c of the side outer panel 25 (that is, a rear pillar). The stepped portion 25e of the step portion 25d of the side sill cover portion 25a is continuous with a front flange 31a at the rear edge of the front pillar 131 (see FIG. 13, FIG. 14, and FIG. 16) and a rear flange 25f at the front edge of the rear quarter panel portion 25c of the side outer panel 25 (see FIG. 14), and a weather strip 40 (see FIG. 15) for providing sealing between an outer peripheral part of the door 39 and the stepped portion 25e, the flange 31a, and the rear flange 25f abuts against the stepped portion 25e, the front flange 31a, and the rear flange 25f.

As shown in FIG. 16, fixed to rear faces of a pair of left and right front pillar lower parts 129 and 129 of the cabin 11 is a metal steering hanger support bracket 41 supporting opposite end parts of a steering hanger, which is not illustrated, extending in the vehicle width direction. The door 39 includes a door outer panel 42 and a door inner panel 43, and a hinge stiffener 44 is superimposed on a rear side of the door inner panel 43 forming a front face of the door 39. A lower door hinge 45 is provided between a vehicle width direction outer face of the steering hanger support bracket 41 and the front face of the door 39, and a front part of the door 39 is pivotably supported on a rear face of the front pillar 131 in cooperation with an upper door hinge (not illustrated) provided on the steering hanger support bracket 41.

The lower door hinge 45 includes a hinge base 52 fixed to a vehicle width direction outer face of the steering hanger support bracket 41 by means of a bolt 51, a fixed side hinge arm 53 projecting outward in the vehicle width direction from the hinge base 52, a hinge base 55 fixed to the front face of the door 39 by means of a bolt 54, a movable side hinge arm 56 projecting forward from the hinge base 55, and a hinge pin 57 linking the fixed side hinge arm 53 and the movable side hinge arm 56.

A door checker 58 connecting a rear face of the steering hanger support bracket 41 and the front face of the door 39 includes a door checker mounting seat 59 formed by folding back the rear end of the hinge base 52 of the lower door hinge 45 to the inside in the vehicle width direction, and the door checker mounting seat 59 is fixed to the rear face of the steering hanger support bracket 41 by means of a bolt 60.

The door checker 58 includes a bracket 61 that is integral with the door checker mounting seat 59, a check plate 63 pivotably supported on the bracket 61 via a pin 62, a stopper 64 provided at the rear end of the check plate 63, and a guide member 65 that is fixed to the hinge stiffener 44 of the door 39 and through which the check plate 63 extends slidably. A restraining feel is given to opening and closing of the door 39 by means of a frictional force generated when the check plate 63 and the guide member 65 move relative to each other, and the maximum opening position of the door 39 is restricted by the stopper 64 abutting against the guide member 65. The front end of the step portion 25d of the side sill cover portion 25a is positioned further inside in the vehicle width direction than the door checker 58 provided at the front end of the door 39.

The operation of the embodiment of the present invention having the above arrangement is now explained.

Compared with a steel sheet cabin, the CFRP cabin 11 has a large cross-sectional area for the side sill 14 due to the demand for strength; as a result, the position of the upper wall 14a of the side sill 14 is high, and the height of the door 39 is low. When the position of the upper wall 14a of the side sill 14 is high, the height of the upper face of the side sill cover portion 25a of the side outer panel 25 covering it also becomes high, and there is the problem that the ease with which an occupant can get in and out is degraded.

However, in accordance with the present embodiment, since the step portion 25d protruding upward is formed on the upper face of the side sill cover portion 25a, even when the height of the side sill 14 is high, it is possible by temporarily placing a foot or a hip on the step portion 25d to enhance the ease with which an occupant can get in and out. Moreover, since the support member 38 is disposed between the step portion 25d and the upper wall 14a of the side sill 14, it is possible by supporting the weight of an occupant by means of the support member 38 to prevent the step portion 25d from being deformed.

Furthermore, since the inner end in the vehicle width direction of the upper face of the side sill cover portion 25a and the upper wall 14a of the side sill 14 are connected via the upper bracket 136 having a crank-shaped cross section, and the inner end in the vehicle width direction of the lower face of the side sill cover portion 25a and the lower wall 14c of the side sill 14 are connected via the lower bracket 137 having a crank-shaped cross section (see FIG. 15), it is possible to assemble the side sill cover portion 25a of the side outer panel 25 on the side sill 14 from the outside in the vehicle width direction, thereby improving the ease of assembly.

Furthermore, since the width W in the vehicle width direction of the step portion 25d (see FIG. 16) increases in going from the front end part toward the middle part in the fore-and-aft direction and then reduces in going from the middle part in the fore-and-aft direction toward the rear end part, the front end part is connected to the front flange 31a of the door opening, and the rear end part is connected to the rear flange 25f of the door opening (see FIG. 14), it is possible to continuously dispose the weather strip 40 (see FIG. 15) from the front flange 31a of the door opening to the rear flange 25f and the step portion 25d while enhancing the ease with which an occupant can get in and out by ensuring a sufficient width W in the vehicle width direction for the middle part in the fore-and-aft direction of the step portion 25d.

Moreover, since the front end of the step portion 25d of the side sill cover portion 25a is positioned further on the inside in the vehicle width direction than the door checker 58 provided at the front end of the door 39 (see FIG. 16), even when the vertical dimension of the door 39 is small due to the height of the side sill 14 being large, it is possible to ensure that there is space for providing the door checker 58 at the front end of the door 39.

Furthermore, since the side outer panel 25 integrally includes the rear fender portion 25*b* that continues to the rear of the side sill cover portion 25*a* and the front end of the side sill cover portion 25*a* is connected to the lower end of the hollow front pillar 131 formed by joining the outer panel 132 and the inner panel 133, it is possible to integrate the side sill cover portion 25*a*, the rear fender portion 25*b*, and the front pillar 131 and mount them on the bathtub-shaped cabin 11.

Fifth Embodiment

A fifth embodiment of the present invention is now explained by reference to FIG. 17 to FIG. 21. Members corresponding to those in the preceding embodiments are denoted by the same reference numerals and symbols, and a detailed explanation thereof is omitted.

A CFRP tailgate panel 24 disposed to the rear of a roof panel 23 includes an opening 24*a* having a rear window glass fitted into a central part thereof, and a front lower face thereof is superimposed on and bonded to an upper face of a joining portion 23*b* in the rear part of the roof panel 23.

A CFRP side outer panel 25 covering left and right side parts of a rear part of the cabin 11 includes a side sill cover portion 25*a* bonded so as to cover a side sill 14, a rear fender portion 25*b* covering the outside in the vehicle width direction of a rear wheel 26 (see FIG. 17 and FIG. 19), and a rear quarter panel portion 25*c* connected to the rear of the side sill cover portion 25*a* and the top of the rear fender portion 25*b*. The upper end of the rear quarter panel portion 25*c* is superimposed on and bonded to an upper face of a recess portion 23*c* of the roof panel 23 (see FIG. 21). That is, the upper end of the rear quarter panel portion 25*c* is supported indirectly on a mounting bracket 22 fixed to a roll bar-supporting bar 21 via the recess portion 23*c* of the roof panel 23.

Figure 19:
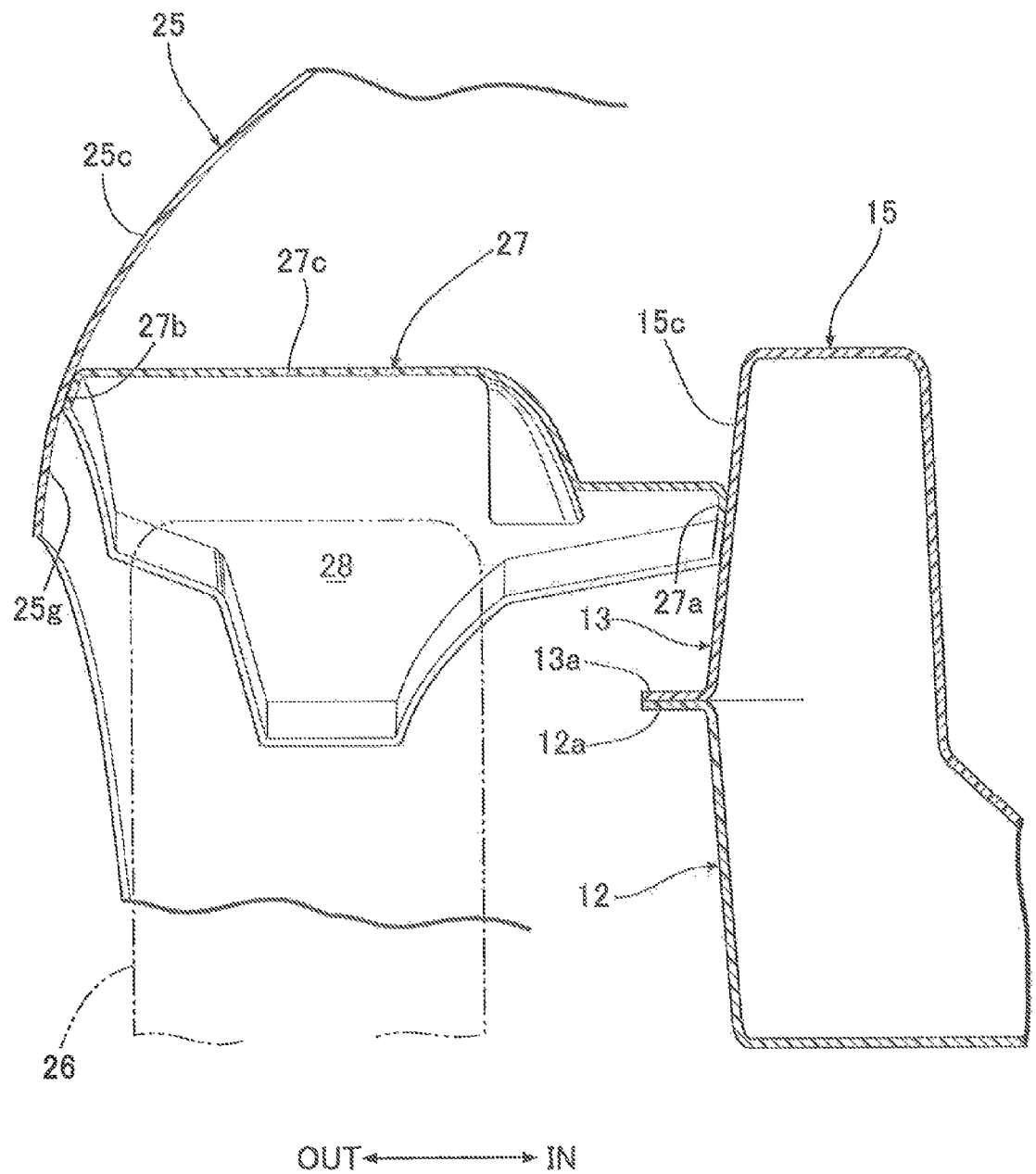
FIG. 19 is a sectional view along line 19-19 in FIG. 18. (fifth embodiment)
Figure 20:
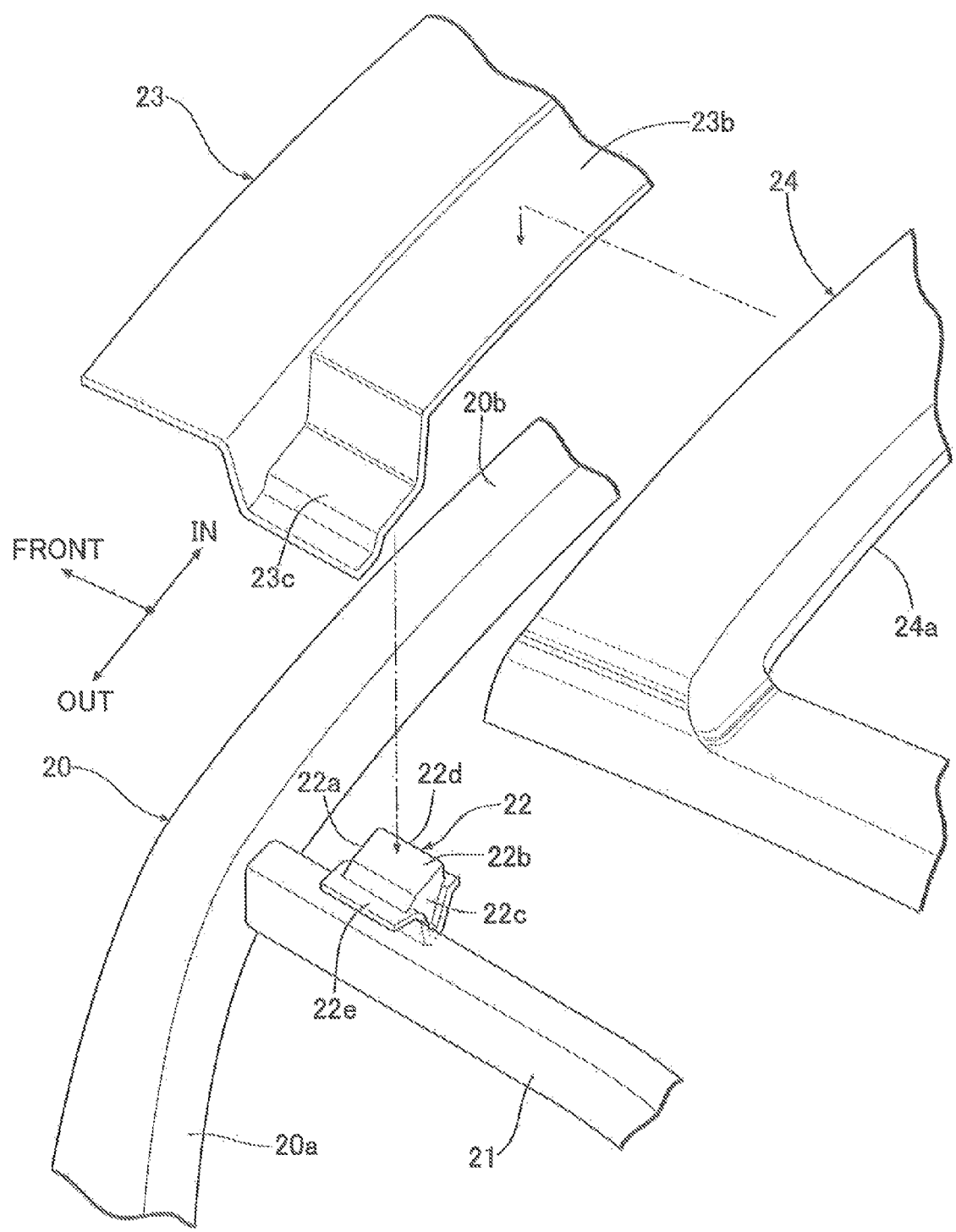
FIG. 20 is an exploded enlarged view of part 20 in FIG. 18. (fifth embodiment)
Figure 21:
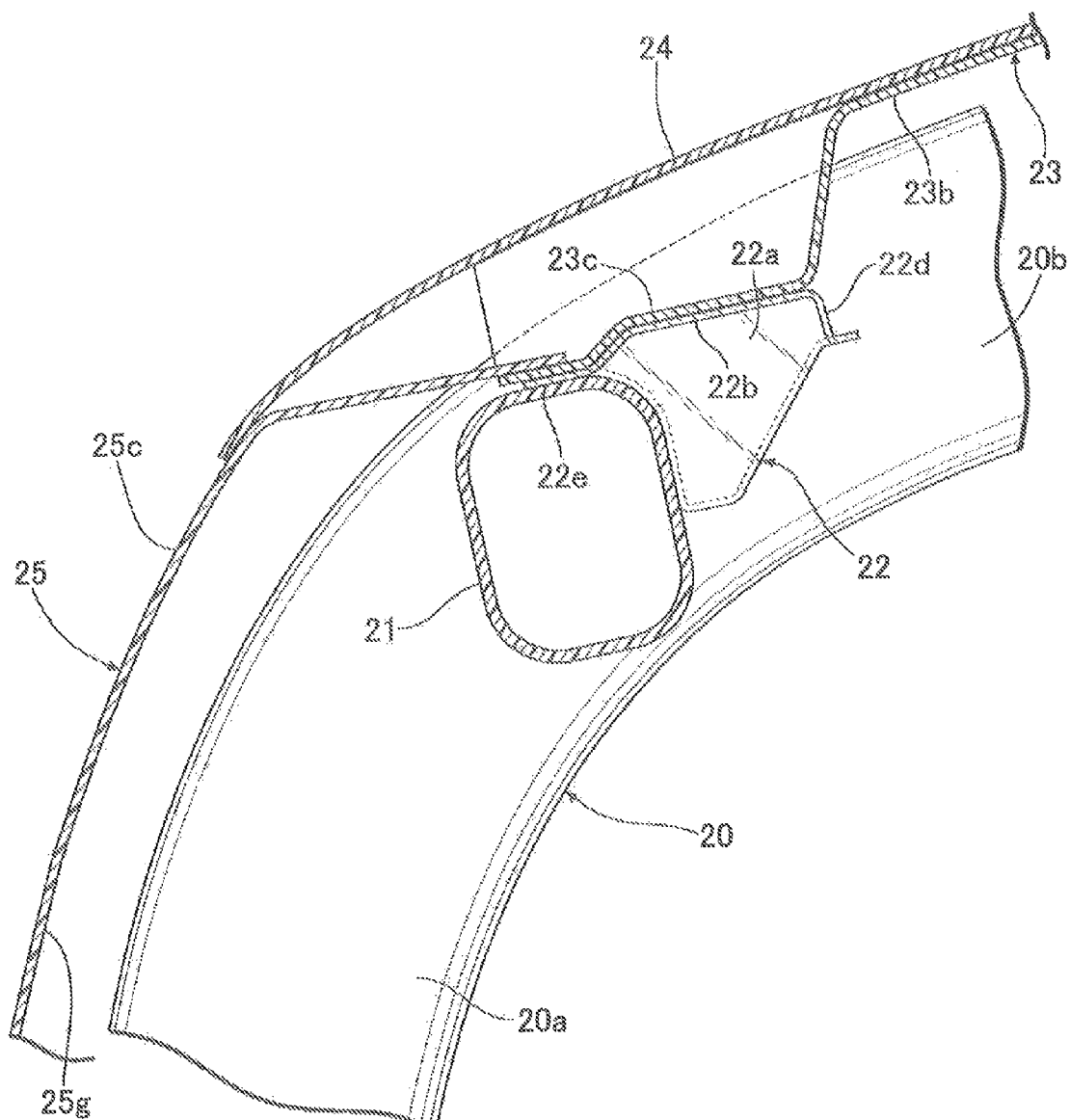
FIG. 21 is a sectional view along line 21-21 in FIG. 18. (fifth embodiment)

Furthermore, continuously bonded to a vehicle width direction outer face 15*c* of a rear frame 15 is an inner joining flange 27*a* formed by folding downward the entire length of the vehicle width direction inner end of a rear fender inner panel 27, which is a CFRP sheet-form member, and continuously bonded to a vehicle width direction inner face 25*g* of the rear quarter panel portion 25*c* of the side outer panel 25 is an outer joining flange 27*b* formed by folding downward the entire length of the vehicle width direction outer end of the rear fender inner panel 27 (see FIG. 19). This forms a rear wheel house 28 housing the rear wheel 26 between the rear fender inner panel 27, the vehicle width direction outer face 15*c* of the rear frame 15, and the rear fender portion 25*b* of the side outer panel 25.

The rear fender inner panel 27 may be made of a steel sheet or an aluminum sheet as long as it is a sheet-form member.

A bulge portion 27*c* curving upwardly so as to follow an upper face of the rear wheel 26 is formed in an intermediate part in the fore-and-aft direction of the rear fender inner panel 27, and in this bulge portion 27*c* the outer joining flange 27*b* also curves upwardly. The front end of the rear fender inner panel 27 extends further forward than the lower end of a side portion 20*a* of a roll bar 20, and the rear end extends further rearward than the lower end of the roll bar-supporting bar 21.

The operation of the embodiment of the present invention having the above arrangement is now explained.

With regard to the side outer panel 25, since the side sill cover portion 25*a* is bonded to the side sill 14, and the rear quarter panel portion 25*c* is indirectly supported on the mounting bracket 22 with the roof panel 23 sandwiched therebetween (see FIG. 21), it is possible, by utilizing the strong roll bar-supporting bar 21 and mounting bracket 22 for supporting the rear part of the roof panel 23, to strongly fix the side outer panel 25.

Furthermore, since the vehicle width direction inner face 25*g* of the rear quarter panel portion 25*c* of the side outer panel 25 is supported on the vehicle width direction outer face 15*c* of the rear frame 15 via the rear fender inner panel 27, not only is it possible to strongly fix the side outer panel 25 by utilizing the rear fender inner panel 27 for forming the wheel house 28 of the rear wheel 26, but it is also possible to partition the wheel house 28 from the vehicle compartment by means of the rear fender inner panel 27.

Moreover, since the cabin 11 includes an inverted U-shaped roll bar 20 and a pair of left and right roll bar-supporting bars 21 and 21 as in the preceding embodiments, the inner joining flanges 27*a* and 27*a* of the rear fender inner panels 27 and 27 are continuously bonded to vehicle width direction outer faces 15*c* and 15*c* of the rear frames 15 and 15 from the lower end of the roll bar 20 to the lower ends of the roll bar-supporting bars 21 and 21, and the outer joining flanges 27*b* and 27*b* are continuously bonded to the vehicle width direction inner faces 25*g* and 25*g* of the rear quarter panel portions 25*c* and 25*c* of the side outer panels 25 and 25, it is possible to enhance the stiffness of the vehicle body rear part by means of the roll bar 20, the roll bar-supporting bars 21 and 21, and the rear fender inner panels 27 and 27.

In particular, since the rear fender inner panel 27 is connected to the vehicle width direction outer face 15*c* of the rear frame 15 continuously from the lower end of the roll bar 20 to the lower end of the roll bar-supporting bar 21, it becomes possible to further enhance the stiffness of the vehicle body rear part and further improve the strength with which the rear fender inner panel 27 is mounted. In this arrangement, since the bulge portion 27*c* protruding upward along the upper face of the rear wheel 26 is formed in the intermediate part in the fore-and-aft direction of the rear fender inner panel 27, and the bulge portion 27*c* is connected to the vehicle width direction inner face 25*g* of the side outer panel 25, it is possible to avoid interference between the rear wheel 26 and the rear fender inner panel 27 by means of the bulge portion 27*c*, and it is possible, by forming the outer joining flange 27*d* of the rear fender inner panel 27 as a curved shape, to further enhance the strength with which the rear fender inner panel 27 is mounted on the vehicle width direction inner face 25*g* of the side outer panel 25.

Embodiments of the present invention are explained above, but the present invention may be modified in a variety of ways as long as the modifications do not depart from the spirit and scope thereof.

For example, the bolt in the second aspect of the present invention is not limited to the stud bolt 29 of the embodiments and may be any bolt.

Furthermore, the fixing means of the present invention is not limited to the locking mechanism 35 of the embodiments and may be any fixing means such as a bolt and a nut when the tailgate panel 24 has a structure that cannot be opened and closed.

Moreover, the shape, material, and production method of the front mounting plate 36 and the rear mounting plate 37 are not limited to those in the embodiments.

Furthermore, in the embodiments the mounting bracket 22 is provided on the roll bar-supporting bar 21, but it may be provided on the roll bar 20.

Moreover, in the embodiments the side outer panel 25 is supported indirectly on the mounting bracket 22 via the roof panel 23, but it may be supported directly on the mounting bracket 22.

Furthermore, the side outer panel 25 is not limited to one made of a CFRP and may be made of a metal such as a steel sheet.

The invention claimed is:

1. An automobile body structure in which a carbon fiber-reinforced plastic (CFRP) cabin formed of a bathtub shape comprises an inverted U-shaped roll bar providing a connection between front parts of a pair of left and right side frames, and a pair of left and right roll bar-supporting bars connecting an upper portion of the roll bar to rear parts of the pair of left and right side frames,
wherein a rear part of a roof panel and a front part of a tailgate panel are supported on a mounting bracket provided on the roll bar-supporting bar; and
wherein the rear part of the roof panel and a tailgate hinge are together fastened to an upper wall of the mounting bracket by a bolt, and the front part of the tailgate panel is pivotably supported on the tailgate hinge.

2. The automobile body structure according to claim 1, wherein the mounting bracket is a member having a squared U-shaped cross section opening downward while comprising a front wall, an upper wall, and a rear wall when viewed in a vehicle width direction, the mounting bracket comprising a flange that is continuously connected to an outer peripheral face from an upper face to a vehicle width direction inner face of the roll bar-supporting bar, which has a hollow pipe shape.

3. The automobile body structure according to claim 1, further comprising a rear combination lamp housing in a rear part of the cabin, and fixing means for fixing the tailgate panel at a closed position is provided on the rear combination lamp housing.

4. An automobile body structure in which a carbon fiber-reinforced plastic (CFRP) cabin formed of a bathtub shape comprises an inverted U-shaped roll bar providing a connection between front parts of a pair of left and right side frames, and a pair of left and right roll bar-supporting bars connecting an upper portion of the roll bar to rear parts of the pair of left and right side frames,
wherein a rear part of a roof panel and a front part of a tailgate panel are supported on a mounting bracket provided on the roll bar-supporting bar; and
wherein the rear part of the roof panel is supported on the roll bar via a front mounting plate and a rear mounting plate, the front mounting plate comprises a roll bar fixed portion fixed to the roll bar, a roof panel support portion extending forward from the roll bar fixed portion and supporting the roof panel, and a reinforcing rib connecting the roll bar fixed portion and the roof panel support portion, and the rear mounting plate comprises a roll bar fixed portion fixed to the roll bar, a roof panel support portion extending rearward from the roll bar fixed portion and supporting the roof panel, and a reinforcing rib connecting the roll bar fixed portion and the roof panel support portion.

5. The automobile body structure according to claim 4, wherein the front mounting plate and the rear mounting plate are each formed by press forming a single CFRP sheet.

6. The automobile body structure according to claim 4, wherein the roof panel support portion of the front mounting plate extends forward from a lower part of a front wall of the roll bar, and the roof panel support portion of the rear mounting plate extends rearward from an upper part of a rear wall of the roll bar.

7. The automobile body structure according to claim 5, wherein the roof panel support portion of the front mounting plate extends forward from a lower part of a front wall of the roll bar, and the roof panel support portion of the rear mounting plate extends rearward from an upper part of a rear wall of the roll bar.

8. The automobile body structure according to claim 4, wherein a rear end of the roof panel is fixed to the mounting bracket on an outside in the vehicle width direction of the rear mounting plate.

9. The automobile body structure according to claim 8, wherein an upper part of a side outer panel covering an outside face in the vehicle width direction of the cabin is connected to the roof panel on the outside in the vehicle width direction of the mounting bracket.

10. An automobile body structure in which a carbon fiber-reinforced plastic (CFRP) cabin formed of a bathtub shape comprises an inverted U-shaped roll bar providing a connection between front parts of a pair of left and right side frames, and a pair of left and right roll bar-supporting bars connecting an upper portion of the roll bar to rear parts of the pair of left and right side frames,
wherein a rear part of a roof panel and a front part of a tailgate panel are supported on a mounting bracket provided on the roll bar-supporting bar; and
wherein the pair of left and right side frames extend rearward from rear ends of a pair of left and right side sills while being biased to an inside in the vehicle width direction so as to bypass a rear wheel, and a vehicle width direction inner face of a side outer panel covering an outside in a vehicle width direction of the cabin and a vehicle width direction outer face of the side frame are connected via a rear fender inner panel, which is a sheet-form member covering an upper part of the rear wheel.

11. The automobile body structure according to claim 10, wherein the rear fender inner panel is connected to the vehicle width direction outer face of the side frame from the lower end of the roll bar to the lower end of the roll bar-supporting bar.

12. The automobile body structure according to claim 11, wherein the rear fender inner panel is connected to the vehicle width direction outer face of the side frame continuously from a lower end of the roll bar to a lower end of the roll bar-supporting bar.

13. The automobile body structure according to claim 10, wherein a bulge portion protruding upward along an upper face of the rear wheel is formed in an intermediate part in a fore-and-aft direction of the rear fender inner panel, and the bulge portion is connected to the vehicle width direction inner face of the side outer panel.

14. The automobile body structure according to claim 11, wherein an upper part of the side outer panel is connected to the roll bar or the roll bar-supporting bar via the mounting bracket.

* * * * *